US007562249B2

(12) United States Patent
Daikokuya et al.

(10) Patent No.: US 7,562,249 B2
(45) Date of Patent: Jul. 14, 2009

(54) RAID SYSTEM, RAID CONTROLLER AND REBUILT/COPY BACK PROCESSING METHOD THEREOF

(75) Inventors: Hidejirou Daikokuya, Kawasaki (JP); Mikio Ito, Kawasaki (JP); Kazuhiko Ikeuchi, Kawasaki (JP); Shinya Mochizuki, Kawasaki (JP); Hideo Takahashi, Kawasaki (JP); Yoshihito Konta, Kawasaki (JP); Hiroaki Ochi, Kawasaki (JP); Tsukasa Makino, Kawasaki (JP); Norihide Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 429 days.

(21) Appl. No.: 11/377,210

(22) Filed: Mar. 17, 2006

(65) Prior Publication Data
US 2007/0101187 A1   May 3, 2007

(30) Foreign Application Priority Data
Oct. 28, 2005   (JP)   ............................. 2005-314695

(51) Int. Cl.
  *G06F 11/00*   (2006.01)
(52) U.S. Cl. ....................................................... 714/6
(58) Field of Classification Search ...................... 714/6, 714/5, 7; 711/114
  See application file for complete search history.

(56) References Cited

U.S. PATENT DOCUMENTS

| 695,096 | A | * | 3/1902 | Faivre | ........................ | 99/402 |
| 5,278,830 | A | * | 1/1994 | Kudo | ......................... | 370/232 |
| 5,446,855 | A | * | 8/1995 | Dang et al. | ................... | 711/1 |
| 5,455,934 | A | * | 10/1995 | Holland et al. | ................ | 711/4 |
| 5,680,509 | A | * | 10/1997 | Gopalakrishnan et al. | ... | 704/240 |
| 5,680,539 | A | * | 10/1997 | Jones | ............................. | 714/6 |
| 5,812,753 | A | * | 9/1998 | Chiariotti | ....................... | 714/6 |
| 5,941,993 | A | * | 8/1999 | Tanaka et al. | .................. | 714/6 |
| 6,032,217 | A | * | 2/2000 | Arnott | ......................... | 710/200 |
| 6,055,354 | A | * | 4/2000 | Bopardikar | .................. | 386/46 |
| 6,185,368 | B1 | * | 2/2001 | Iwasaki et al. | .............. | 386/125 |
| 6,233,967 | B1 | * | 5/2001 | Seewald et al. | ............... | 62/470 |

(Continued)

FOREIGN PATENT DOCUMENTS

JP    06-250795    9/1994

(Continued)

OTHER PUBLICATIONS

Office Action issued in corresponding Korean Patent Application No. 10-2006-0023801, on Aug. 7, 2007.

*Primary Examiner*—Robert Beausoliel
*Assistant Examiner*—Amine Riad
(74) *Attorney, Agent, or Firm*—Staas & Halsey LLP

(57) ABSTRACT

A RAID system access a physical disk and perform Rebuild/Copy back processing according to a host I/O request, so as to implement high-speed Rebuild/Copy back processing without interfering with the processing of a normal I/O. When one disk device fails, out of a plurality of disk devices constituting a RAID configuration, the controller performs Rebuild/Copy back processing to reconstruct the RAID. In Rebuild/Copy back, the controller reads the data from one disk and writes the data to another disk, so the presence of a normal I/O is judged, and when a normal I/O is absent, read and write of these different disk drives are executed simultaneously. By this, the Rebuild/Copy back time can be decreased.

17 Claims, 15 Drawing Sheets

U.S. PATENT DOCUMENTS

| | | | | |
|---|---|---|---|---|
| 6,321,345 | B1 * | 11/2001 | Mann et al. | 714/6 |
| 6,336,193 | B1 * | 1/2002 | Yudenfriend et al. | 714/15 |
| 6,480,904 | B1 * | 11/2002 | Kato et al. | 710/6 |
| 6,516,425 | B1 * | 2/2003 | Belhadj et al. | 714/6 |
| 6,542,954 | B1 * | 4/2003 | Aruga | 710/316 |
| 6,647,514 | B1 * | 11/2003 | Umberger et al. | 714/42 |
| 6,820,172 | B2 * | 11/2004 | Nielsen et al. | 711/114 |
| 6,886,108 | B2 * | 4/2005 | Talagala | 714/5 |
| 7,136,970 | B2 * | 11/2006 | Yoshiya et al. | 711/152 |
| 7,191,285 | B2 | 3/2007 | Scales et al. | |
| 7,213,165 | B2 * | 5/2007 | Umberger et al. | 714/7 |
| 7,434,095 | B2 * | 10/2008 | Tanaka et al. | 714/6 |
| 2002/0036882 | A1 * | 3/2002 | Kishi et al. | 361/306.3 |
| 2003/0163509 | A1 * | 8/2003 | McKean et al. | 709/100 |
| 2003/0237019 | A1 * | 12/2003 | Kleiman et al. | 714/6 |
| 2004/0230742 | A1 | 11/2004 | Ikeuchi et al. | |
| 2005/0283655 | A1 * | 12/2005 | Ashmore | 714/7 |

FOREIGN PATENT DOCUMENTS

| | | |
|---|---|---|
| JP | 11-102261 | 4/1999 |
| JP | 2000-276305 | 10/2000 |
| JP | 2004-295860 | 10/2004 |
| KR | 10-2004-0092424 | 11/2004 |

* cited by examiner

RAID SYSTEM, RAID CONTROLLER AND REBUILT/COPY BACK PROCESSING METHOD THEREOF

CROSS-REFERENCE TO RELATED APPLICATIONS

This application is based upon and claims the benefit of priority from the prior Japanese Patent Application No. 2005-314695, filed on Oct. 28, 2005, the entire contents of which are incorporated herein by reference.

BACKGROUND OF THE INVENTION

1. Field of the Invention

The present invention relates to a RAID system, in which data are stored with redundancy in a plurality of disk device and in which when a part of the disk devices fails the redundant configuration is reconstructed by Rebuilding and copying back with data from other disk devices, and relates to RAID controller, and to Rebuild/Copy back processing method thereof, and more particularly to a RAID system for decreasing the Rebuild and Copy back processing time, and RAID controller and Rebuild/Copy back processing method thereof.

2. Description of the Related Art

As various data is being computerized and handled on computers, the importance of data storage devices (external storage devices), which can store large volumes of data efficiently with high reliability independently from the host computer that can execute data processing, is increasing today.

As such a data storage device, a disk array device has many disk devices (e.g. magnetic disk devices, optical disk devices) and disk controller for controlling these many disk devices are being used. This disk array device implements the redundancy of data by using a RAID (Redundant Array of Inexpensive Disk) configuration so as to improve reliability.

In such a disk array device, if a disk device constituting a RAID group fails and loses redundancy, the redundancy must be recovered. FIG. 14 is a diagram depicting the rebuild function of RAID 5 for such redundancy recovery. For active maintenance, a spare disk device HS (Hot Spare Disk) is installed to the four disk devices #0, #1, #2 and #3 constituting RAID 5.

This disk device group 160 is connected to a pair of disk controllers 110. Each disk controller 110 has a disk adapter 140 for controlling interface with the disk device group 160, a control unit 120 and a channel adapter 100 for controlling interface with the host (not illustrated).

If the disk device #0 of the four disk devices constituting RAID 5 failed, the data of the disk device #1, #2 and #3, other than this failed disk device #0, is read to the cache memory or data buffer (not illustrated) of the control unit 120 via the disk adapter 140, and the XOR operation is performed to create the redundant data.

And the created redundant data is written to the spare disk device HS via the disk adapter 140 to recover redundancy. This is called the "Rebuild function". In the case of RAID 1, the data which was read is directly written to the spare disk device HS.

FIG. 15, on the other hand, is a diagram depicting the Copy back function. When the failed disk device #0 is replaced with a new disk device New in a status where Rebuild in FIG. 14 completed, Copy back processing is performed. In other words, the redundant data written in the spare disk device HS is written back to the new disk device New.

In order to execute this Rebuild/Copy back processing while processing I/O requests from the host, a method for balancing the number of these requests was proposed (e.g. Japanese Patent Application Laid-Open No. 2004-295860).

As FIG. 16 shows, in the case of Rebuild/Copy back processing, write processing to the disk drive #2 at the write destination is executed after read processing from the original disk drive #1 is completed, even if a normal I/O (host I/O, internal I/O) is absent.

In other words, if the OVSM module for managing Rebuilt/Copy back processing requests one time of Copy back to the RAID control module, which executes RAID access, the RAID control module completes reading of the disk drive #1, then executes writing to the disk drive #2. And the RAID control module receives the write completion from the disk drive #2, reports the completion of the requested Copy back to the OVSM module, and the OVSM module executes the next Copy back request processing.

Therefore to perform Rebuild/Copy back processing while accepting a normal I/O processing, processing for one unit of a disk device cannot be performed all at once. So the operation to read data from the normal disk device and write it to the write destination disk device is executed in parts for a number of times to recover the data volume of the disk device.

In the case of Rebuild, for example, data is read from a normal disk device, redundant data is created unless this is RAID 1 (mirroring), and the data is written to the spare disk device HS or a new disk device New, and in the case of Copy back, the data is read from the spare disk HS and written to the new disk device New.

Conventionally for these operations, read and write are recognized as integrated, and read and write are handled as one unit, therefore unless one time of read and write processing ends, the next read and write processing cannot be started.

Therefore if a normal I/O is absent, it takes time until completion of Rebuild/Copy back compared with the normal performance of a disk device. Recently the time until the completion of Rebuild/Copy back is becoming longer due to the increase of data base capacity and the increase of the storage capacity of disk devices.

In some cases the operation of Rebuild/Copy back may be requested to the CE (Customer Engineer) of the system manufacturer, which means that the CE must be present at the equipment installation location until these processings complete, so the processing wait time for the CE increases, and decreasing such processing time is demanded.

SUMMARY OF THE INVENTION

With the foregoing in view, it is an object of the present invention to provide a RAID system for improving the performance of Rebuild/Copy back processing when Rebuild/Copy back processing is executed while processing normal I/O requests, and a RAID controller and Rebuild/Copy back processing method thereof.

It is another object of the present invention to provide a RAID system for decreasing the completion time of Rebuild/Copy back when a normal I/O request and rebuilt/Copy back are processed with balance, and a RAID controller and Rebuild/Copy back processing method thereof.

It is still another object of the present invention to provide a RAID-system for judging the presence of a normal I/O request and executing Rebuild/Copy back processing at high-speed, and a RAID controller and Rebuild/Copy back processing method thereof.

To achieve these objects, the present invention is a RAID system for accessing a connected disk device and executing an I/O request according to the I/O request requested by a host, having a plurality of disk devices constituting the RAID, and a controller for executing the operation of reading data of a disk device, other than a failed disk device, when one of the plurality of disk devices failed, and writing the data to a spare disk device or a new disk device in parts for a plurality of times to execute Rebuild or Copy back processing for reconstructing the RAID configuration. And the controller judges whether a normal I/O request, including an I/O request from the host, did not arrive for a predetermined time, and executes read and write processing of the Rebuild or Copy back in parallel when the normal I/O request does not arrive for a predetermined time.

The present invention is also a RAID controller for accessing a connected disk device and executing an I/O request according to the I/O request requested by a host, having a first interface circuit for controlling interface with the host, a second interface circuit for controlling interface with the plurality of disk devices constituting the RAID, and a controller for executing an operation of reading data of a disk device, other than a failed disk device when one of the plurality of disk devices fails, and writing the data to a spare disk device or a new disk device in parts for a plurality of times to execute the Rebuild or Copy back processing for reconstructing the RAID configuration. And the controller judges whether a normal I/O request, including an I/O request from the host, does not arrive for a predetermined time, and executes read and write processing of the Rebuild or Copy back in parallel when a normal I/O request does not arrive for a predetermined time.

The present invention is also a Rebuild/Copy back processing method for a RAID system which accesses a connected disk device and executes an I/O request according to the I/O request requested by a host, having the steps of: processing of Rebuild/Copy back for executing an operation of reading data of a disk device, other than a failed disk device, when one of the plurality of disk devices constituting the RAID fails, and writing the data to a spare disk device or a new disk device in parts for a plurality of times to execute Rebuild or Copy back processing for reconstructing the RAID configuration; judging whether a normal I/O request, including an I/O request from the host, does not arrive for a predetermined time; and executing read and write processing of the Rebuild or Copy back processing in parallel when the normal I/O request does not arrive for a predetermined time.

In the present invention, it is preferable that the controller records the processing completion time of a normal I/O request each time the processing of the normal I/O request completes, and compares the processing completion time and current time to judge whether a normal I/O request does not arrive for a predetermined time.

Also in the present invention, it is preferable that the controller balances and executes the normal I/O request and request for one time of Rebuild/Copy back, and issues a write and read request of the next Rebuild/Copy back according to the completion of parallel write and read of the Rebuild/Copy back.

Also in the present invention, it is preferable that the controller has a progress table for managing the progress status of the Rebuild/Copy back processing, and creates a read request for one time for Rebuild or Copy back processing according to the progress table, and updates the progress table according to the completion of the parallel write and read of the Rebuild/Copy back.

Also in the present invention, it is preferable that the controller further has a RAID control module for executing a request for the Rebuild/Copy back by dividing the request into processing up to read and processing from write, and a Rebuild/Copy back module for issuing the read request and write request of the Rebuild/Copy back processing independently to the RAID control module.

Also in the present invention, it is preferable that the Rebuild/Copy back module judges the transition between the case when a normal I/O request does not arrive for a predetermined time and the case when a normal I/O request arrives within a predetermined time, and issues the read and write requests of the Rebuild or Copy back in parallel according to the judgment result.

Also in the present invention, it is preferable that the controller issues a read request for one time of the Rebuild or Copy back processing when the case when a normal I/O request arrives within a predetermined time transits to the case when a normal I/O request does not arrive for a predetermined time, and issues the read and write requests for the Rebuild or Copy back in parallel when the processing of the read request completes.

Also in the present invention, it is preferable that when one of the plurality of disk devices constituting the RAID fails, the controller executes an operation of reading data of a disk device, other than the failed disk device, and writing the data to a spare disk device in parts for a plurality of times, and after executing the Rebuild processing for reconstructing the RAID configuration, the controller executes an operation of reading the data in the spare disk device and writing the data to a new disk device provided in place of the failed disk device, in parts for a plurality of times, so as to execute the Copy back processing.

In the present invention, in Rebuild/Copy back, the data is read from one disk and is written to another disk, so the presence of a normal I/O is judged, and when a normal I/O is absent, read and write of these different disk drives are performed simultaneously. By this, the Rebuild/Copy back time is decreased.

DESCRIPTION OF THE PREFERRED EMBODIMENTS

Embodiments of the present invention will now be described in the sequence of the disk array device (RAID system), thread configuration, Rebuild/Copy back processing, parallel processing of Rebuild/Copy back, and other embodiments.

Disk Array Device

Figure 1:
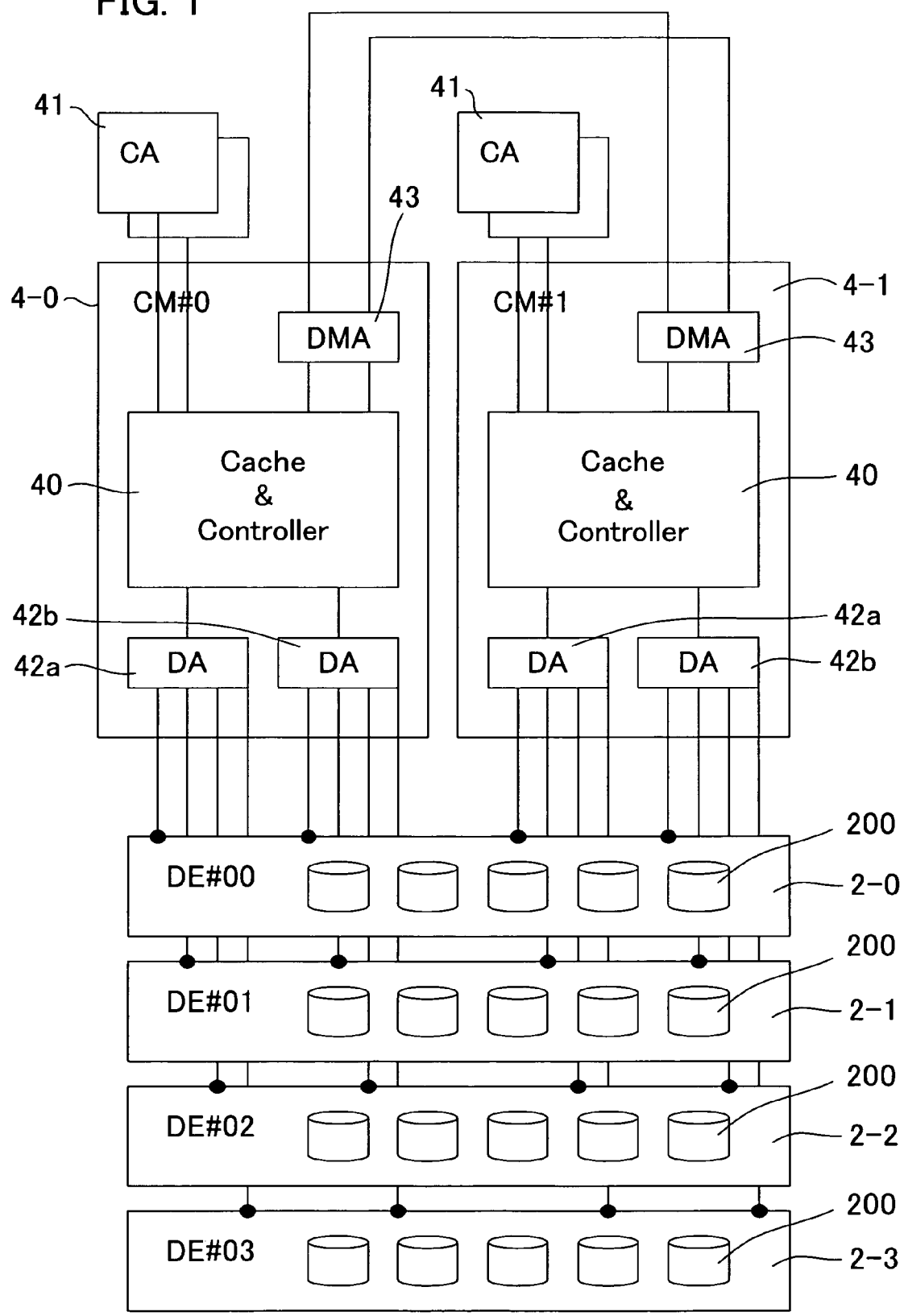
FIG. 1 is a block diagram depicting a disk array device according to an embodiment of the present invention.
Figure 2:
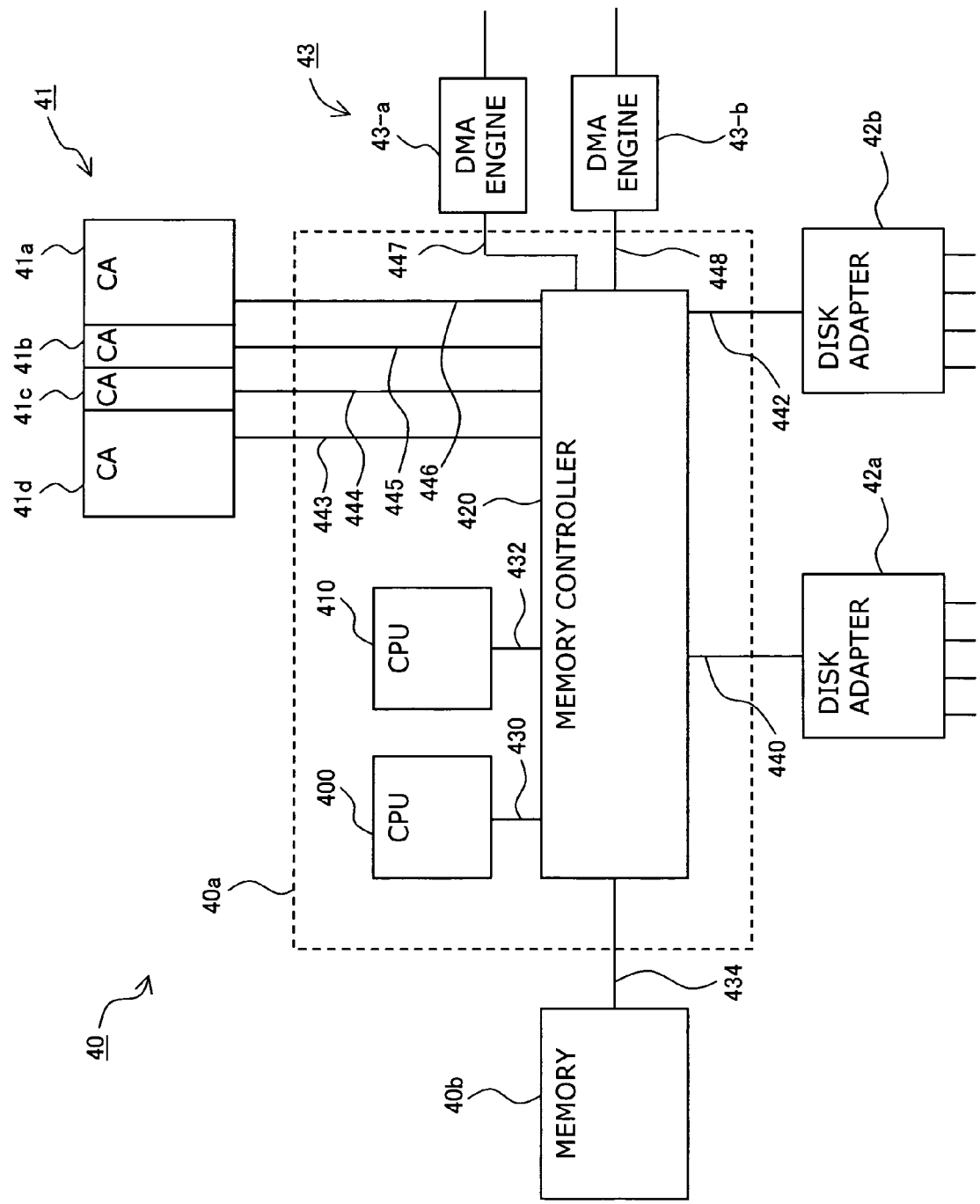
FIG. 2 is a block diagram depicting a control module in FIG. 1.

FIG. 1 is a block diagram depicting the disk array device according to an embodiment of the present invention, and FIG. 2 is a block diagram depicting the control module in FIG. 1.

FIG. 1 shows a small scale disk array device having two control modules as an example, but the present invention can be applied just the same for a medium scale disk array device with four control modules, and for a large scale disk array device with eight control modules.

As FIG. 1 shows, the disk array device has a plurality of disk enclosures 2-0 to 2-3 for mounting a plurality of disk devices for holding data, and a plurality of (two in this case) control modules (RAID controllers) 4-0 to 4-1 installed between a host computer (data processing device), which is not illustrated, and the plurality of disk enclosures 2-0 to 2-3.

Each of the control modules 4-0 to 4-1 has a controller 40, channel adapter (first interface section: CA in FIG. 1) 41, disk adapters (second interface section: DA in FIG. 1) 42a and 42b, and DMA (Direct Memory Access) engine (communication section: DMA in FIG. 1) 43.

The control modules 4-0 to 4-1 will be described with reference to FIG. 1 and FIG. 2. The controller 40 performs read/write processing based on a processing request (read request or write request) from the host computer, and has a memory 40b and control unit 40a.

The memory 40b includes a cache area which plays a role of a cache for a plurality of disks by holding a part of data held in the plurality of disks of the disk enclosures 2-0 to 2-3, and the other work area.

The control unit 40a controls the memory 40b, channel adapter 41, device adapters 42a and 42b, and DMA 43. For this, the control unit 40a has one or more (two in FIG. 1 and FIG. 2) CPUs 400 and 410, and a memory controller 420. The memory controller 420 controls read/write of the memory 40b, and switches the paths.

The memory controller 420 is connected to the memory 40b via the memory bus 434, and is connected to the CPUs 400 and 410 via the CPU buses 430 and 432, and the memory controller 420 is also connected to the disk adapters 42a and 42b via the four lane high-speed serial buses (e.g. PCI-Express) 440 and 442.

In the same way, the memory controller 420 is connected to the channel adapter 41 (four channel adapters 41a, 41b, 41c and 41d in this case) via the four lane high-speed serial buses (e.g. PCI-Express) 443, 444, 445 and 446, and connected to the DMA 43 (two DMAs 43-a and 43-b in this case) via the four lane high-speed serial buses (e.g. PCI-Express) 447 and 448.

The high-speed serial bus, such as PCI-Express, communicates in packets, and by installing a plurality of serial buses, communication with low delay and high response speed, that is with low latency, is implemented even if the number of signal lines is decreased.

The channel adapters 41a to 41d are interfaces with the host computer, and the channel adapters 41a to 41d are connected to different host computers respectively. It is preferable that the channel adapters 41a to 41d are connected to the interface section of the corresponding host computer respectively via a bus, such as Fiber Channel and Ethernet®, and in this case an optical fiber or coaxial cable is used for the bus.

Each of these channel adapters 41a to 41d constitutes a part of each control module 4-0 to 4-1. A channel adapter 41a to 41d supports a plurality of protocols as the interface section between the corresponding host computer and the control module 4-0 to 4-1.

Here the protocol to be installed is different depending on the corresponding host computer, so each channel adapter 41a to 41d is mounted on a printed circuit board different from that of the controller 40, which is a major unit of the control module 4-0 to 4-1 so as to be replaced easily when necessary.

An example of a protocol with the host computer to be supported by the channel adapters 41a to 41d is iSCSI (internet Small Computer system Interface), which supports Fiber Channel and Ethernet®, as mentioned above.

Each channel adapter 41a to 41d is also directly connected to the controller 40 by a bus for connecting LSI (Large Scale Integration) and a printed circuit board, such as a PCI-Express bus, as mentioned above. By this, high throughput required between each channel adapter 41a to 41d and the controller 40 can be implemented.

The disk adapter 42a/42b is the interface for each disk drive of the disk enclosure 2-0 to 2-3, and is connected to the disk enclosure 2-0 to 2-3, and has four FC (Fiber Channel) ports in this example.

Each disk adapter 42a and 42b is directly connected to the controller 40 by the bus designed for connecting LSI (Large Scale Integration) and printed circuit board, such as a PCI-Express bus, as mentioned above. By this, high throughput required between each disk adapter 42a and 42b and the controller 40 can be implemented.

As FIG. 1 shows, each of the disk enclosures 2-0 to 2-3 has a plurality of (e.g. 15) disk drives 200, which has two ports respectively. And in the disk enclosures 2-0 to 2-3, each port of each disk drive 200 is connected to two ports via a pair of FC cables which come from the two ports.

These two ports connect the disk adapters 42a and 42b of each control module 4-0 to 4-1 to all the disk enclosures 2-0 to 2-3 respectively. In other words, the disk adapter 42a of each control module 4-0 to 4-1 is connected to the disk enclosures 2-0 to 2-3. In the same way, the disk adapter 42b of each control module 4-0 to 4-1 is connected to the disk enclosures 2-0 to 2-3.

By this configuration, each control module 4-0 to 4-1 can access all the disk enclosures (disk drives) 2-0 to 2-3 via any disk adapter 42a and 42b and any path.

Each disk adapter 42a/42b and corresponding disk enclosure 2-0 to 2-3 are connected via a fiber channel, for example, and in this case optical cable is used for connection since the modules are different.

As FIG. 1 shows, the DMA engine 43 is for mutually communicating with each control module 4-0 to 4-1, and is in-charge of communication and data transfer processing with other control modules. Each DMA engine 43 of each control module 4-0 to 4-1 constitutes a part of the control module 4-0 to 4-1, and is mounted on a board of the controller 40, which is a major unit of the control module 4-0 to 4-1. And each DMA engine 43 is directly connected to the controller 40 via the above mentioned high-speed serial bus, and mutually communicate with the DMA engine 43 of another control module 4-0 to 4-1.

By this configuration, each DMA engine 43 of each control module 4-0 to 4-1 performs communication generated by an access request from the host computer, and executes data transfer processing (e.g. mirroring processing) between the controller 40 connected to the self and other control modules 4-0 to 4-1.

Also as FIG. 2 shows, the DMA engine 43 of each control module 4-0 to 4-1 is comprised of a plurality of (two in this case) DMA engines 43-*a* and 43-*b*, and each of these two DMA engines 43-*a* and 43-*b* is connected to the controller 40 via the PCI-Express bus, for example, as shown in FIG. 2. In other words, in the case of communication and data transfer (DMA) processing between each control module 4-0 to 4-1 (that is between controllers 40 of each control module 4-0 to 4-1), it is desirable that the data transfer volume is high and the time required for communication control is short, since high throughput and low latency (fast response speed) are demanded. For this, as FIG. 1 and FIG. 2 show, the DMA engine 43 of each control module 4-0 to 4-1 is connected via a bus (PCI-Express or Rapid-IO) using a high-speed serial transmission which is designed to satisfy both demands of high throughput and low latency.

PCI-Express and Rapid-IO use 2.5 Gbps high-speed serial transmission, and for these bus interfaces, a low amplitude differential interface called LVDS (Low Voltage Differential Signaling) is used.

Thread Configuration

Figure 3:
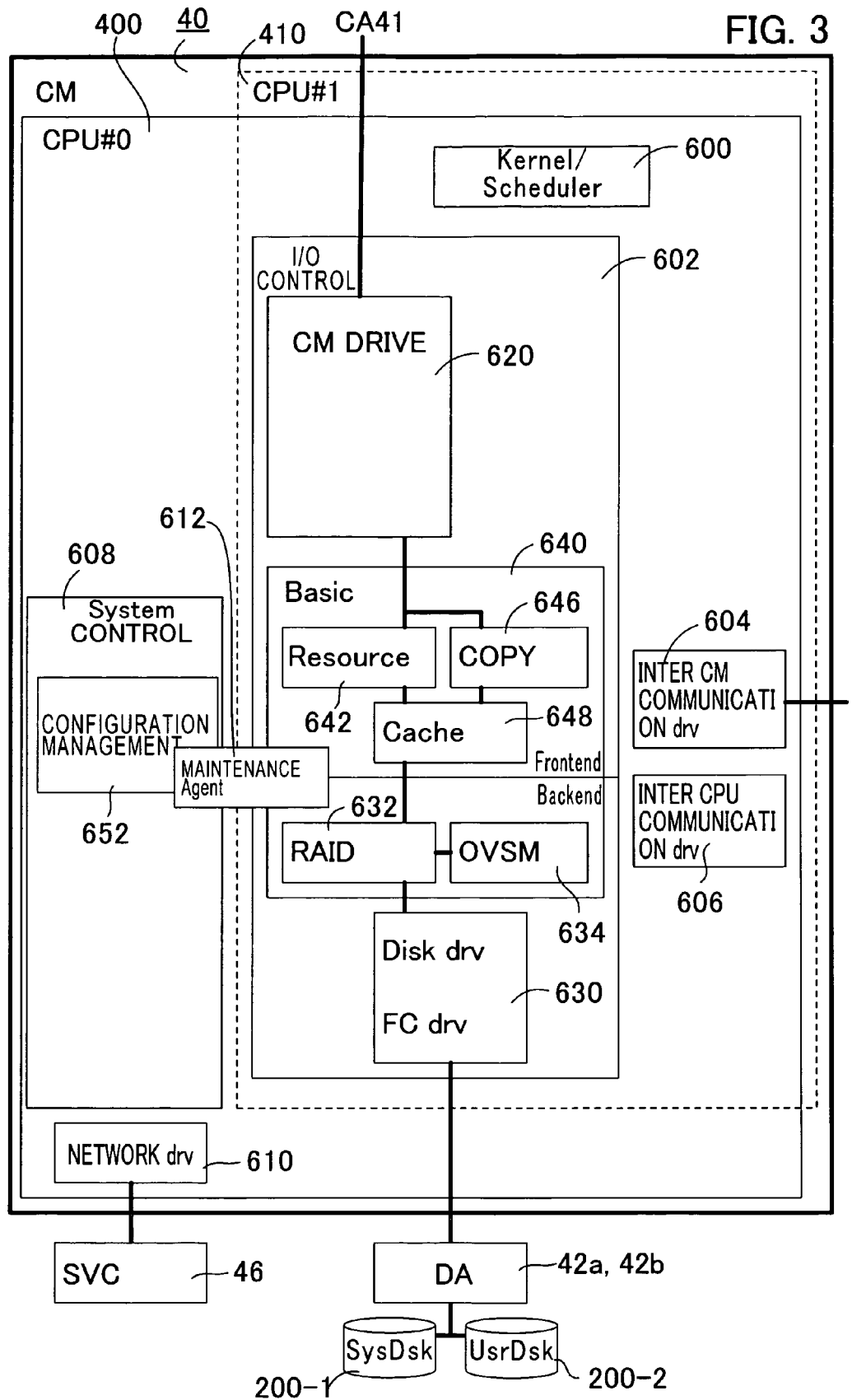
FIG. 3 is a functional block diagram depicting the firmware of the control module in FIG. 1 and FIG. 2.
Figure 4:
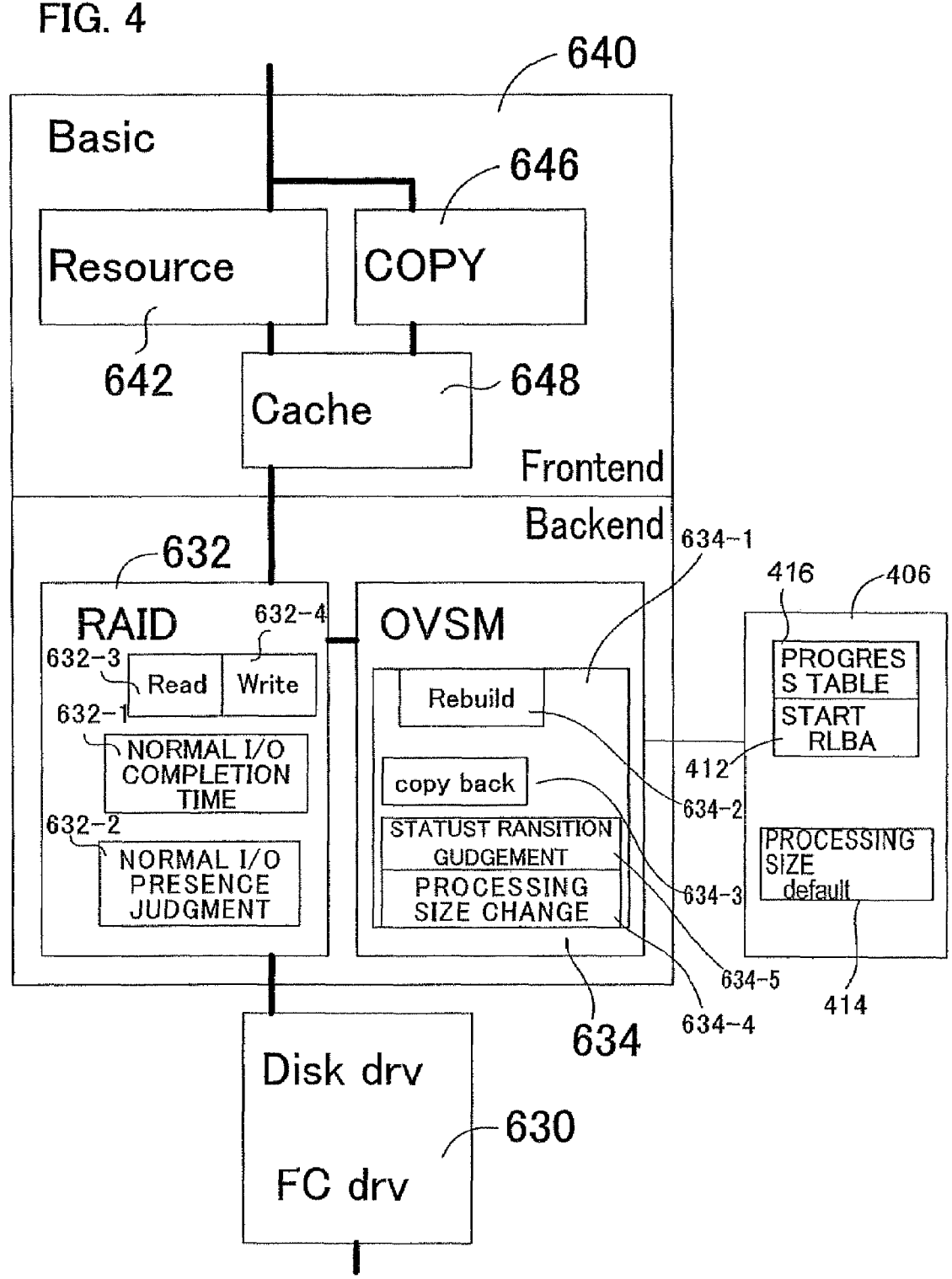
FIG. 4 is a block diagram depicting details of the firmware in FIG. 3.

Now the program module (thread) to be executed by the CPU 400 (410) will be described. FIG. 3 is a block diagram depicting the thread of the software to be executed by the CPU 400 (410), and FIG. 4 is a diagram depicting details thereof. As FIG. 3 shows, the software module has a Kernel/Scheduler 600, an IO control module 602, inter-CM communication driver 604, inter-CPU communication driver 606, system control module 608 and network driver 610.

The Kernel/Scheduler 600 is an operating system, such as MS-DOS®. The IO control module 602 is comprised of a CM-CA driver 620, basic module 640 and CM-DA driver 630. The CM-CA driver 620 is a driver for driving CA (Channel Adapter) 41.

The basic module 640 has a front end having a resource thread (resource control module) 642 for managing resources, copy thread (copy control module) 646 for performing copy processing, and cache thread (cache memory control module) 648 for controlling the cache memory of the memory 40*b*, and a back end having a RAID thread (RAID control module) 632 for controlling the RAID configuration, and OVSM thread (OVSM control module) 634.

The OVSM thread 634 performs the later mentioned Rebuild/Copy back processing. The maintenance agent 612 sends various notices to the OVSM thread 634. The CM-DA driver 630 is a driver for driving the DA (Disk adapter) 42. The inter-CM communication driver 604 communicates with another CM (Control module), and the inter-CPU communication driver 606 communicates with another CPU 410.

The system control module 608 has the configuration management module 652. The configuration management module 652 creates the configuration definition table, which includes the RLU (Raid Logical Unit) table for configuration definitions, in the memory 40*b* according to the specifications from the service controller 46 via the network driver 610. The service controller 46 is not illustrated in FIG. 1, and is common to each CM (Control Module).

The disk drive 200 disposed in the disk enclosure 2-0 to 2-3 connected to the DA 42 is divided into the system disk 200-1 and the user disk 200-2, and the configuration definition table is stored in the system disk 200-1.

The resource module 642 and the RAID module 632 refer to the configuration definition table, convert the LUN (Logical Unit Number) from the host into the PLBA (Physical block address) of the physical disk, and access the physical disk 200.

As FIG. 4 shows, the OVSM thread 634 has the Rebuild/Copy back module 634-1 for managing the progress of Rebuild/Copy back. The Rebuild/Copy back module 634-1 requests each time of Rebuild/Copy back processing to the later mentioned RAID control module 632, receives the response thereof, and records the progress of Rebuild/Copy back.

Whereas the RAID control module 632 acquires the buffer for temporarily saving data (hereafter called data buffer), and instructs read or write to the disk device. Particularly in the case of Rebuild/Copy back, the RAID control module 632 is in-charge of read processing 632-3 for reading data from the disk device, and storing it to the data buffer, and write processing 632-4 for writing the contents of the data buffer to the disk device.

The RAID control module 632 has the normal I/O completion time recording section 632-1 for recording the time when the final normal I/O completed, a normal I/O presence judgment module 632-2 for comparing the time of the normal I/O completion time recording section 632-1 and the current time to judge whether 5 seconds of difference, for example, exists.

The OVSM module 634 has the Rebuild/Copy back modules 634-2 and 634-3 for requesting actual Rebuild/Copy back processing to the RAID control module 632, a processing size change module 634-4 for calling up the judgment result of the normal I/O presence judgment module 632-2 when the actual processing is requested, and changing the processing size of one time of actual processing depending on the result, and the status transition judgment processing module 634-5 for executing the later mentioned parallel processing of Rebuild/Copy back.

The Rebuild/Copy back module 634-1 refers to the progress table 416 for storing the start LBA in the memory 40*b* and the default storage section 414 which stores the default values of the processing size, decides one time of actual processing size, and requests actual processing.

By this configuration, the OVSM module 634 confirms the presence of a normal I/O (whether 5 seconds or more has elapsed since a normal I/O became absent) for the RAID control module 632 every time the OVSM module 634 requests an actual processing of Rebuild/Copy back to the RAID control module 632, receives the result thereof, and then the OVSM module 634 judges the status transition and changes the multiple request and parameters (size of one time of processing) of the actual Rebuild/Copy back processing to be transferred to the RAID control module 632.

Here 5 seconds or more is used to judge the presence of a normal I/O, because a recognition error can be prevented when timing when an I/O is present, and timing when an I/O is absent, are alternately repeated. In other words, when a normal I/O rarely arrives, even if a normal I/O is absent at the timing of Rebuild/Copy back, a normal I/O may be generated immediately after Rebuild/Copy back is started. Such a case is classified into normal I/O present status, so that processing of the normal I/O is not delayed.

Rebuild/Copy Back Processing

Figure 5:
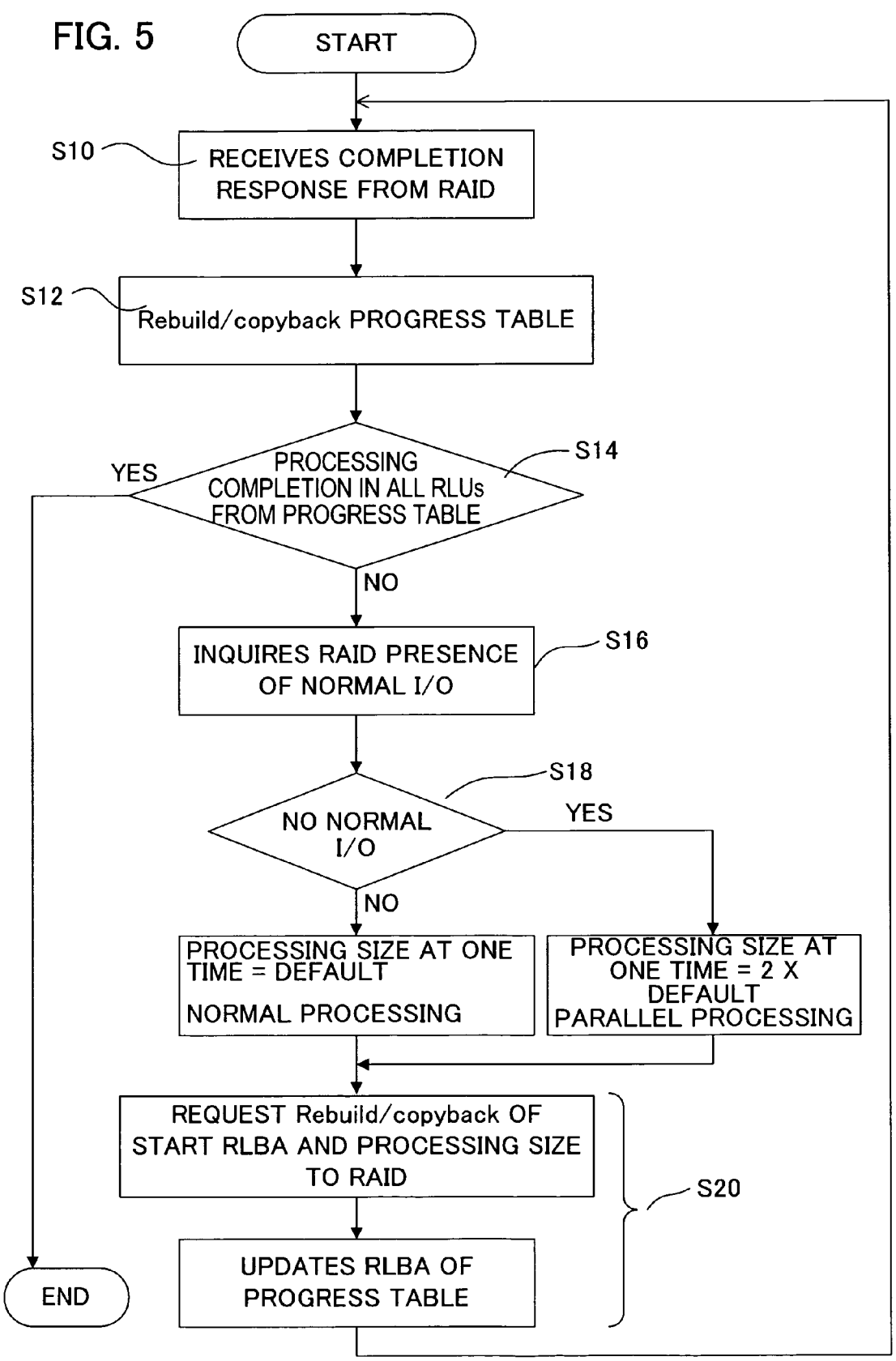
FIG. 5 is a flow chart depicting the Rebuild/Copy back processing according to an embodiment of the present invention.
Figure 6:
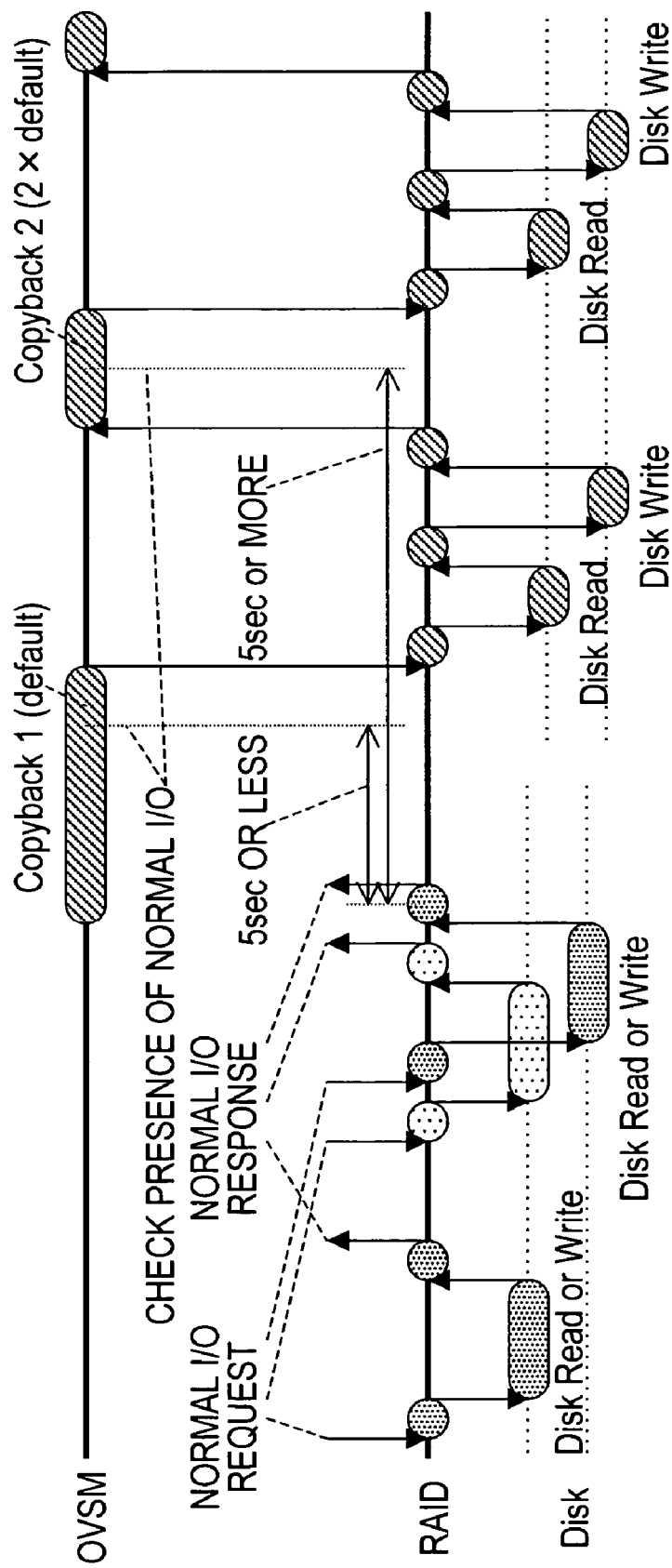
FIG. 6 is a time chart depicting the processing in FIG. 5.
Figure 7:
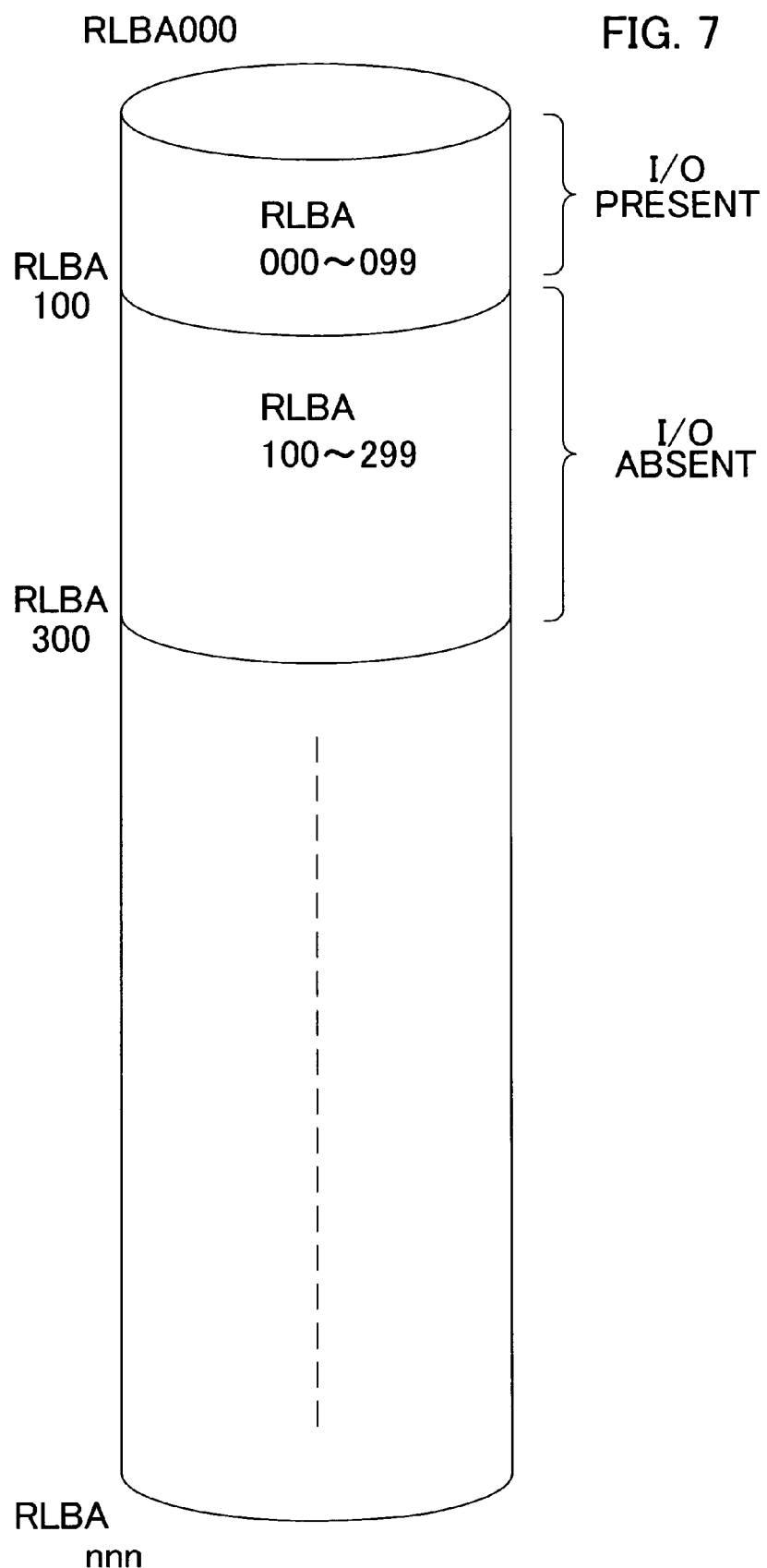
FIG. 7 is a diagram depicting the operation of the processing in FIG. 5.

FIG. 5 is a flow chart depicting the Rebuild/Copy back processing according to an embodiment of the present invention, FIG. 6 is a time chart thereof, and FIG. 7 is an operation diagram thereof.

The Rebuild/Copy back processing in FIG. 5 will now be described with reference to FIG. 6 and FIG. 7.

(S10) First at the start of Rebuild/Copy back, the OVSM module 634 confirms that a completion response was received from the RAID control module 632.

(S12) Then the Rebuild/Copy back module 634-1 of the CVSM module 634 refers to the start RLBA of the Rebuild/Copy back progress table 416 of the memory 40b. As FIG. 7 shows, if the target of the Rebuild/Copy back processing is LBA (Logical Block Address) '000' to 'nnn' in the RAID configuration, the start RLBA of the target data of the next Rebuild/Copy back processing has been recorded in the start RLBA.

(S14) The Rebuild/Copy back module 634-1 judges whether the processing of all the target RLUs (Raid Logical Unit) is completed by the start RLBA of the progress table 416. Processing ends if the Rebuild/Copy back module 634-1 judges that the processing of all the RLUs as completed.

(S16) If the Rebuild/Copy back module 634-1 judges that the processing of all the RLUs is not completed, the Rebuild/Copy back module 634-1 inquires the presence of a normal I/O to the RAID control module 632. As described in FIG. 4, the RAID control module 632 judges whether 5 seconds or more has elapsed since a normal I/O became absent.

(S18) The Rebuild/Copy back module 634-1 confirms whether or not a normal I/O is present by the response from the RAID control module 632, and if a normal I/O is present, the size for one time of processing is set to the default value of the memory 40b, as shown in the Copy back 1 in FIG. 6, and as mentioned later, normal processing is executed. If a normal I/O is absent, the size for one time of processing is set to double the default value of the memory 40b, as shown in Copy back 2 in FIG. 6, and parallel processing is performed, as mentioned later.

(S20) And the Rebuild/Copy back module 634-1 requests actual processing, with a start RLBA and the processing size being set, to the RAID control module 632, for read and write separately. Also the Rebuild/Copy back module 634-1 adds the processing size to the start RLBA to calculate the next start RLBA, and updates the progress table 416 to the calculated start RLBA. And processing returns to step S10.

In this way, as FIG. 7 shows, comparing a normal I/O present status (hereafter called dynamic status) and a normal I/O absent status (hereafter called static status), the size for one time of processing is increased and read/write are parallel-processed in the case of static status. If the size for one time is increased, the Rebuild/Copy back processing speed increases, but influence on a normal I/O increases instead.

Therefore in the case of dynamic status, a processing size, which does not interfere with the processing of a normal I/O, is specified, and in the case of static status, a processing size larger than this (size of one track or more of physical disk drive, for example, is desirable in terms of disk performance) is specified. To specify the size, parameters when actual Rebuild/Copy back processing is requested from OVSM 634 to RAID control 632 are simply changed.

In the case of access processing from the host in FIG. 3, the CA 41, which received a read request from the host, notifies this to the resource module 642 via the CM-CA driver 620, and the resource module 642 accepts this read request.

The resource module 642 requests the cache module 648 to judge whether a cache hit occurred or not. That is, the cache module 648 checks whether the data of the LBA (OLBA) of the target host LUN exists in the cache area of the memory 40b, and if it exists (hit), the cache module 648 reads the data of the OLBA (host logical block address) of the memory 40b, and transfers the data to the host from the CA 41 via the CM-CA driver 620.

If it is judged that the data of the LIBA (OLBA) of the target host LUN does not exist in the cache area of the memory 40b (miss hit), the cache module 648 requests the RAID control module 632 of the back end to read data from the physical disk. The RAID module 632 converts the LBA (OLBA) of the host LUN, of which processing was requested, into the LBA (RLBA) of the RAID group.

Then the RAID control module 632 converts the LBA (RLBA) of the RAID group into the LBA (DLBA) of the virtual disk. Then the RAID module 632 converts the LBA (DLBA) of the virtual disk, of which processing was requested, into the LBA (PLBA) of the physical disk. This processing is different depending on the RAID configuration (e.g. RAID 1, RAID 5).

Then the RAID module 632 determines the disk enclosure and slot from the LBA (PLBA) of the physical disk of which processing was requested, and sends a read request to the LBA (PLBA) of the physical disk 200. In other words, the RAID module 632 sends a read request of this physical disk to the corresponding DA 42 via the CM-DA driver 630, and accesses the physical disk.

When the data is read from the physical disk and the cache module 648 stores the data to the cache area of the memory 40b via DA 42, and reading completes, the resource module 642 transfers this read data from CA 41 to the host via the CM-CA driver 620, and the processing ends.

For the write processing from the host, the write data is stored once in the cache area of the memory 40b, then is written back to the physical disk according to the internal write back schedule. For this write back as well, address conversion processing, using the configuration definition table, is performed in the processing after a miss hit.

The RAID control module 632 prioritizes normal I/Os, such as an accepted host I/O, internal I/O (e.g. write back) and accepted Rebuild/Copy back requests, according to a predetermined I/O ratio, and request them to the CM-DA module 630 in the lower layer according to the priority.

In this way, the size for one time of processing of Rebuild/Copy back is changed according to the presence of a normal I/O managed by RAID control, as FIG. 7 shows, so if a normal I/O is present, Rebuild/Copy back can be executed without interfering with the processing of a normal I/O, and in static status, a processing size larger than this is specified, and Rebuild/Copy back processing can be implemented at high-speed.

The RAID control module 632 performs normal I/O presence judgment processing by recording the time when the final normal I/O completed, comparing this time and current time, and judging if there is a 5 second difference, for example, so the Rebuild/Copy back module 634-1 can easily change the processing size by inquiry, and progresses the Rebuild/Copy back processing.

Parallel Processing of Rebuild/Copy Back

Figure 8:
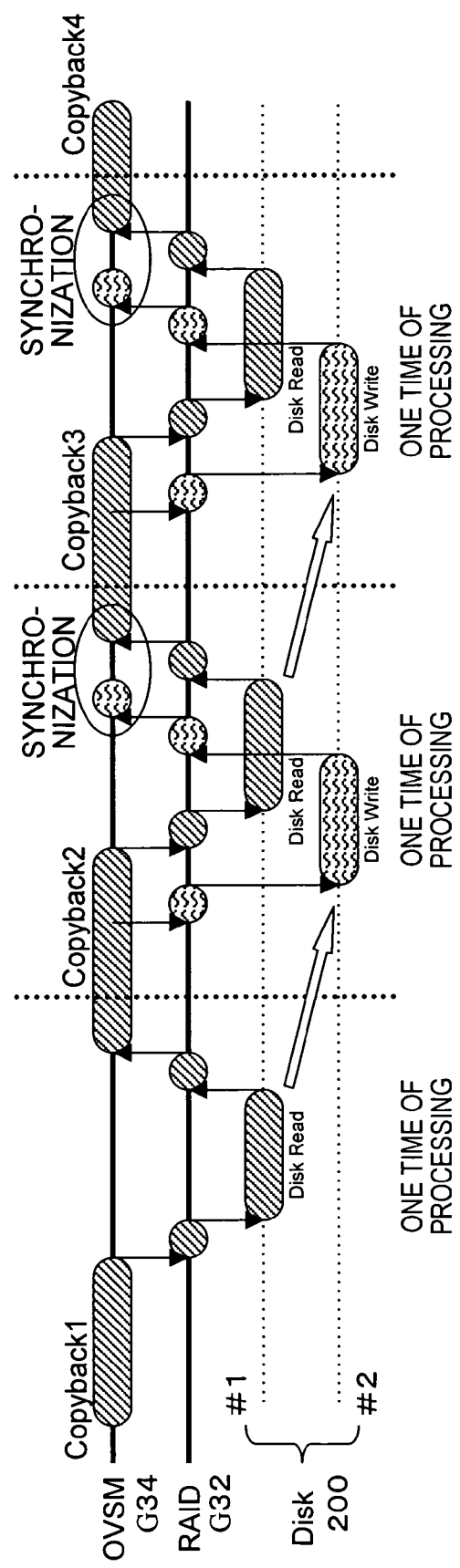
FIG. 8 is a time chart depicting the parallel processing of Rebuild/Copy back according to an embodiment of the present invention.
Figure 9:
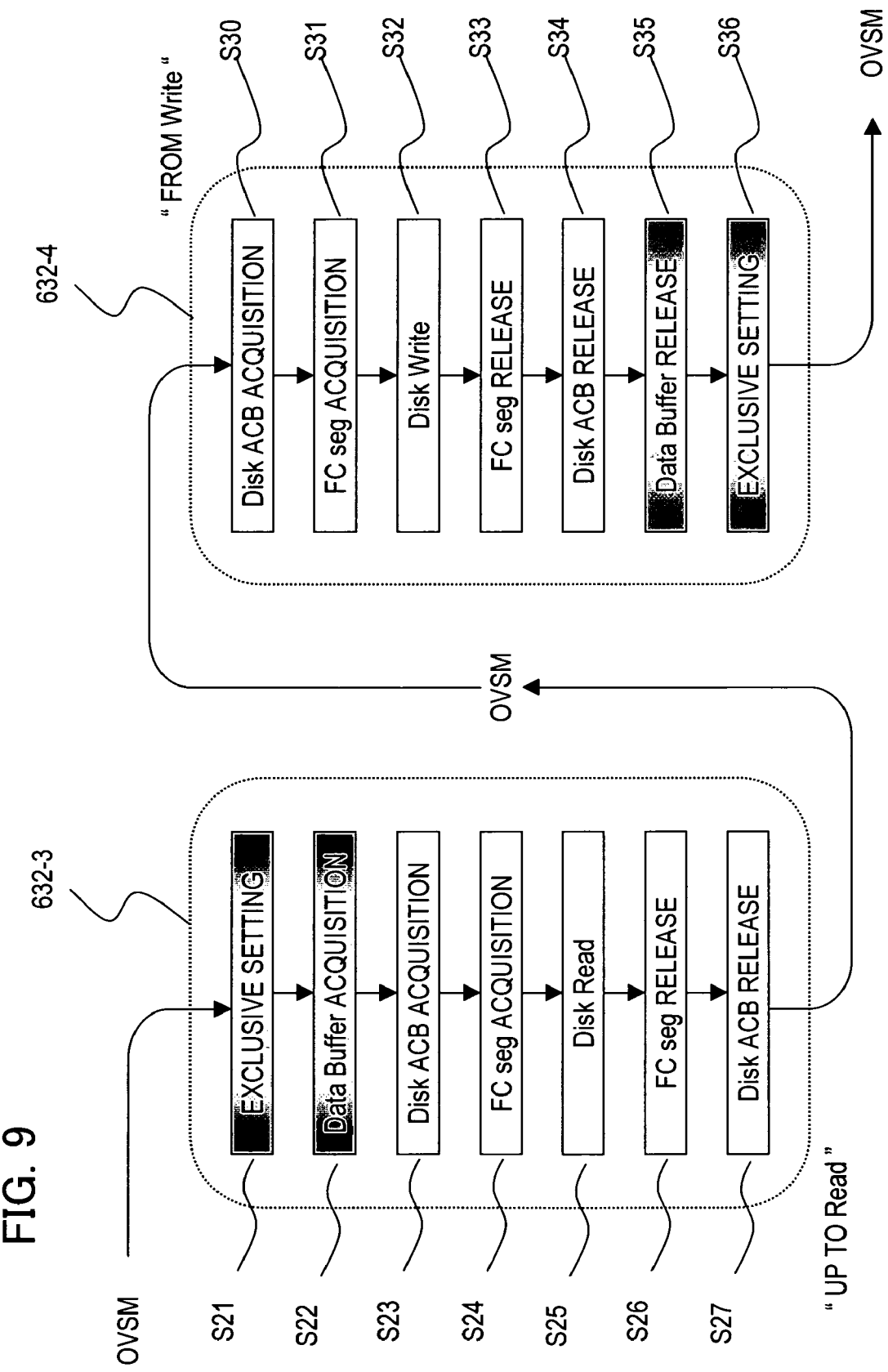
FIG. 9 is a flow chart depicting the processing of the RAID control module in FIG. 4.
Figure 10:
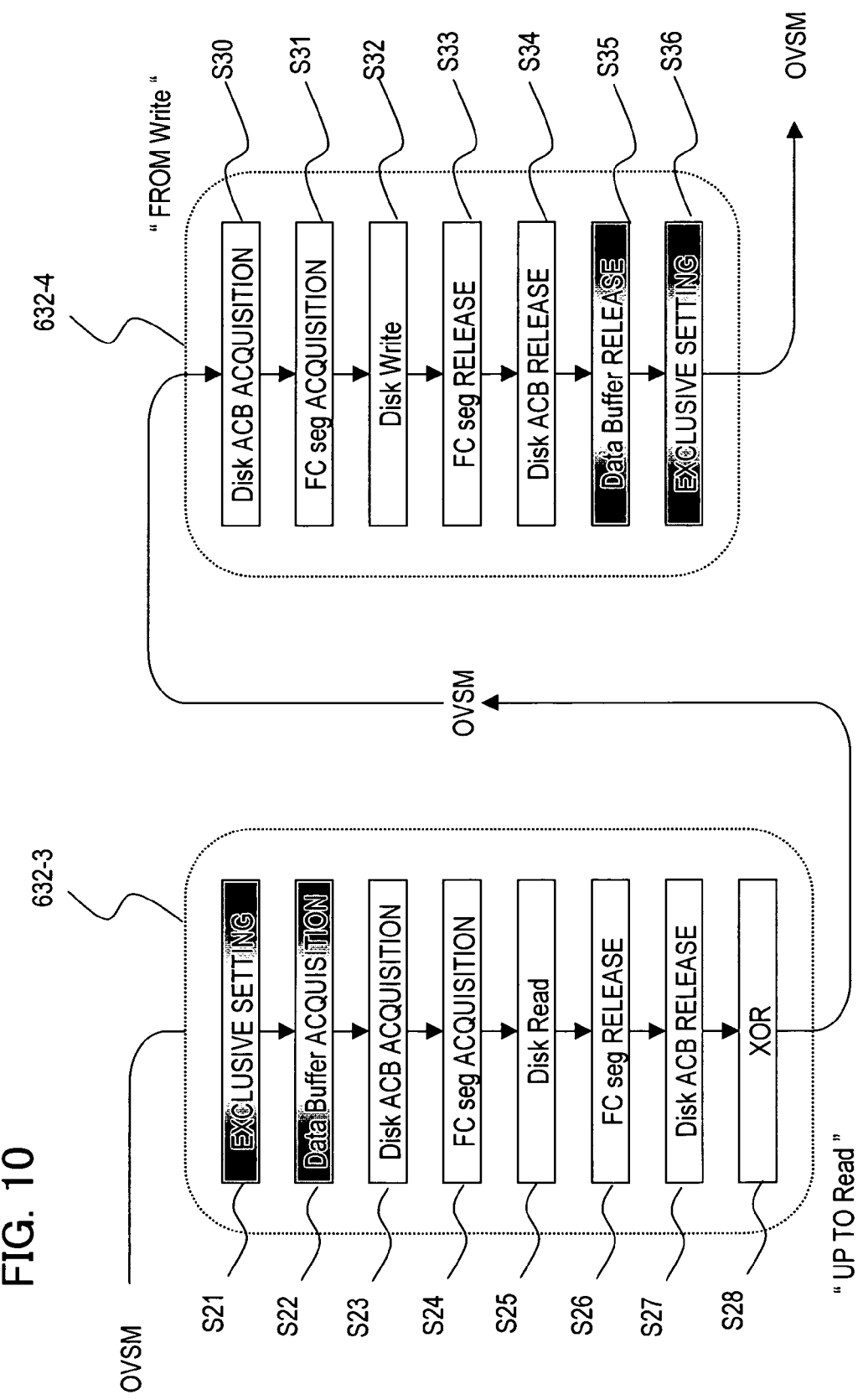
FIG. 10 is a flow chart depicting another processing of the RAID control module in FIG. 4.

Now the parallel processing of Rebuild/Copy back in the above mentioned case when a normal I/O is absent (static status) will be described. FIG. 8 is a time chart depicting the parallel processing of Rebuild/Copy back according to an embodiment of the present invention, and FIG. 9 and FIG. 10 are flow charts depicting the processing of the RAID control module.

As FIG. 8 shows, in the case of Rebuild/Copy back, data is read from one disk and written to another disk. Read and write to these different disk drives are simultaneously performed. By this, Rebuild/Copy back time is decreased. This function is called "parallel processing".

As FIG. 4 and FIG. 8 show, the RAID control module 632 divides actual Rebuild/Copy back processing into processing for only "up to read" 632-3 and processing for only "from write" 632-4. The OVSM module 634 individually creates a processing request for only "up to read" and a processing request for only "from write". In the case of dynamic status (in the case of an I/O that is present), read and write are continuously performed.

Whereas in the case of static status (in the case of an I/O that is absent), the OVSM module 634 calls up processing for "up to read" 632-3 and processing for "from write" 632-4 respectively, as shown in FIG. 8. In the case of processing for "up to read" 632-3, the RAID control module 632-3 finishes processing in the status where the data buffer is acquired and an exclusive right is set, and sends a response to the OVSM module 634.

This processing will now be described concretely in FIG. 8 using Copy back processing as an example. As FIG. 8 shows, the OVSM module 634 requests "up to read" for the first area to the RAID control module 632 only for the first one time of Copy back 1.

For the second or later Copy back 2, 3, 4, . . . , the OVSM module 634 sequentially requests a processing request for "from write" for the area of which reading just completed, and a processing request for "up to read" for the next area to the RAID control module 632, when read from the RAID control module 632 is completed.

In the same way, when write completion and read completion are received from the RAID control module 632, the OVSM module 634 sequentially requests a processing request for "from write" for the area of which reading just completed, and a processing request for "up to read" for the next area to the RAID control module 632.

The OVSM module 634 receives write completion and read completion from the RAID control module 632, and request only processing for "from write" only for the last one time of Copy back.

In this way, the read operation from the disk #1 and the write operation to the disk #2 are executed in parallel for the second and later time of Copy back, which is effective to decrease the time of Copy back processing. This is the same for Rebuild processing.

FIG. 9 and FIG. 10 are flow charts depicting the processing for "up to read" 632-3 and the processing for "from write" 632-4 of the RAID control module 632. FIG. 9 shows an example of Rebuild of RAID 1 and Copy back of RAID 1 and RAID 5, and FIG. 10 shows an example of Rebuild processing of RAID 5.

As FIG. 9 shows in the processing for "up to read" 632-3 of the RAID control module 632, the exclusive right is set (S21), then the data buffer is acquired in the memory 40b (S22). And the ACB (Access Control Block) of the disk is acquired (S23), and the FC segment of the FC loop is acquired (S24). By this, the disk drive is read-accessed via the driver 630 and the disk adapter 42, and read data is stored to the acquired data buffer (S25).

Then the FC segment is released (S26), and the ACB of the disk is released (S27). Then the read processing 632-3 of the RAID control module reports the read completion to the OVSM module 634.

In the processing for "from write" 632-4 of the RAID control module 632, on the other hand, the ACB (Access Control Block) of the disk is acquired (S30), and the FC segment of the FC loop is acquired (S31). By this, the disk drive is write-accessed via the driver 630 and disk adapter 42, and the read data in the data buffer of the memory 40b is written to the disk (S32).

And the FC segment is released (S33), and the ACB of the disk is released (S34). Then the data buffer is released (S35), the exclusive right is cleared (S36), and the write completion is reported to the OVSM module 634.

Figure 14:
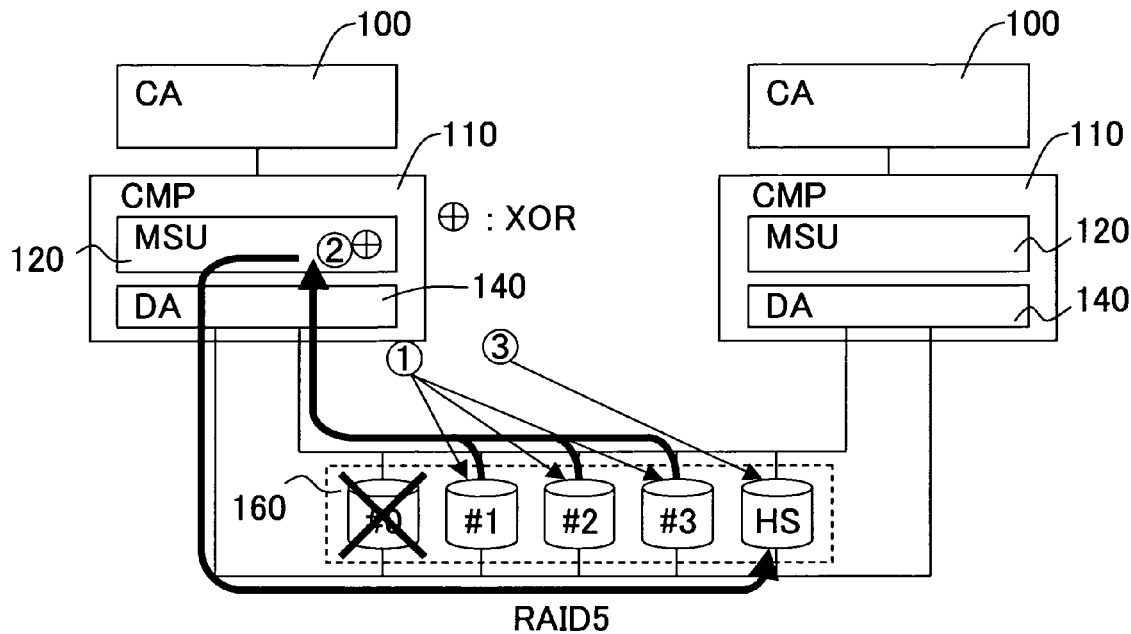
FIG. 14 is a diagram depicting a conventional Rebuild processing.
Figure 15:
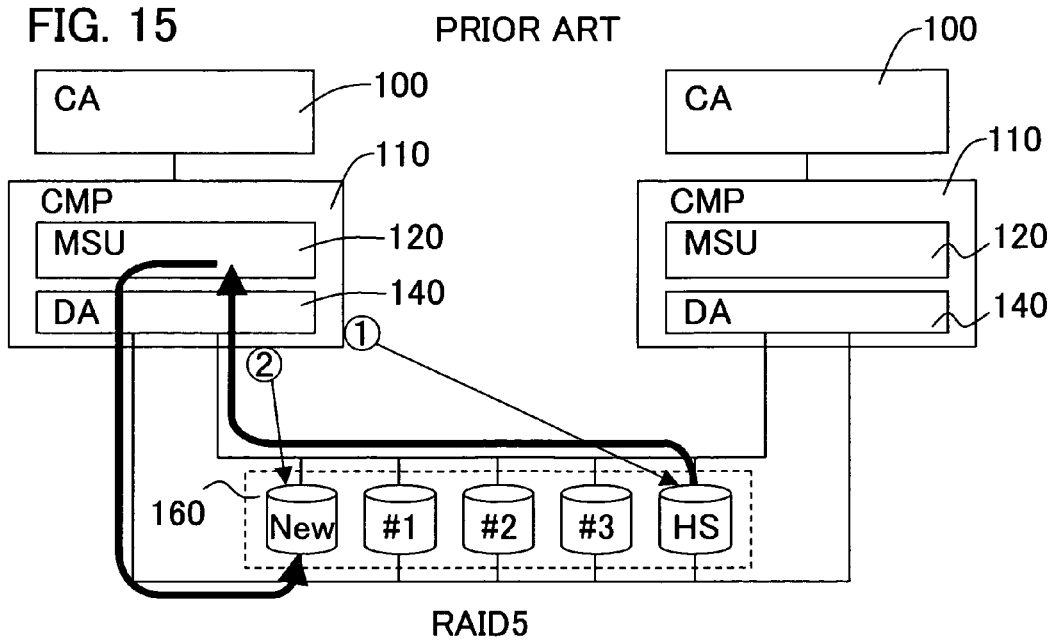
FIG. 15 is a diagram depicting a conventional Copy back processing.
Figure 16:
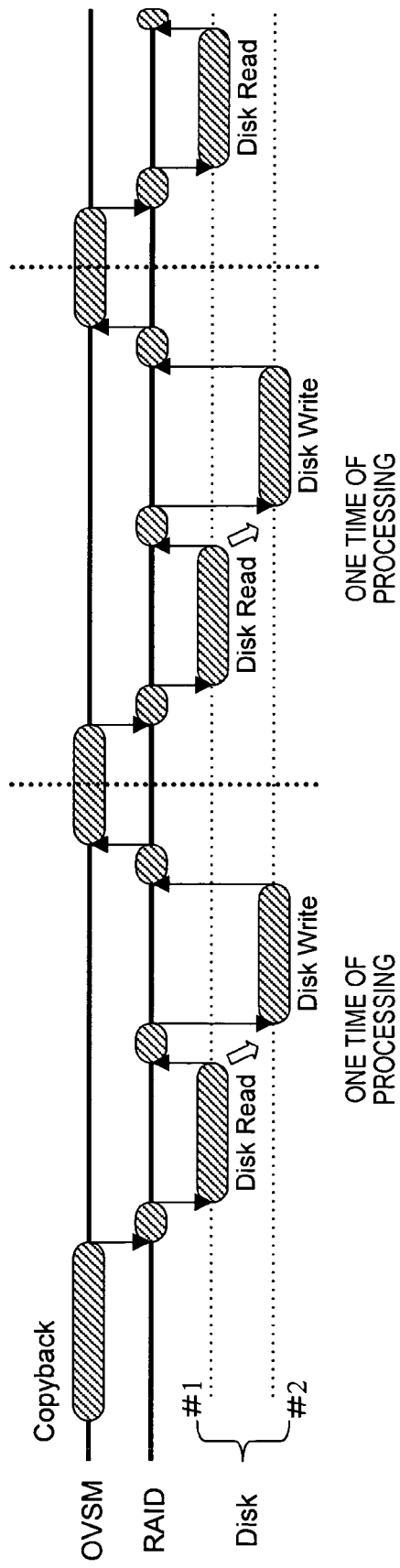
FIG. 16 is a time chart depicting a conventional Copy back processing.

In the case of Rebuild processing of RAID 5 in FIG. 10, the regeneration of data by XOR is required in read processing 632-3, as described in FIG. 14, so the disk read in S25 is performed for a plurality of (three) disk drives #1, #2 and #3 in FIG. 14, and after the ACB of the disk is released, XOR processing (S28) for creating redundant data from three data is performed, and the read completion is reported to the OVSM module 634. The write processing 632-4 is the same as FIG. 9.

For the acquisition and release of the data buffer, both the data buffer for reading for the above mentioned regeneration and the data buffer for writing the result of regeneration are simultaneously acquired and released. In the case of processing for "from write" 632-4, the data read for regeneration is unnecessary but is held. By this, release processing is omitted so as to increase the speed of processing.

When the processing for "from write" completes, the OVSM module 634 updates the progress of Rebuild/Copy back processing in step S20 in FIG. 5.

Now the parallel processing of Rebuild/Copy back will be described more concretely. If this parallel processing is used, the operation of Rebuild/Copy back is switched when dynamic status and static status are changed. Therefore the OVSM module 634 decides what the next processing will be when a response from the RAID control module 632 is received.

Figure 11:
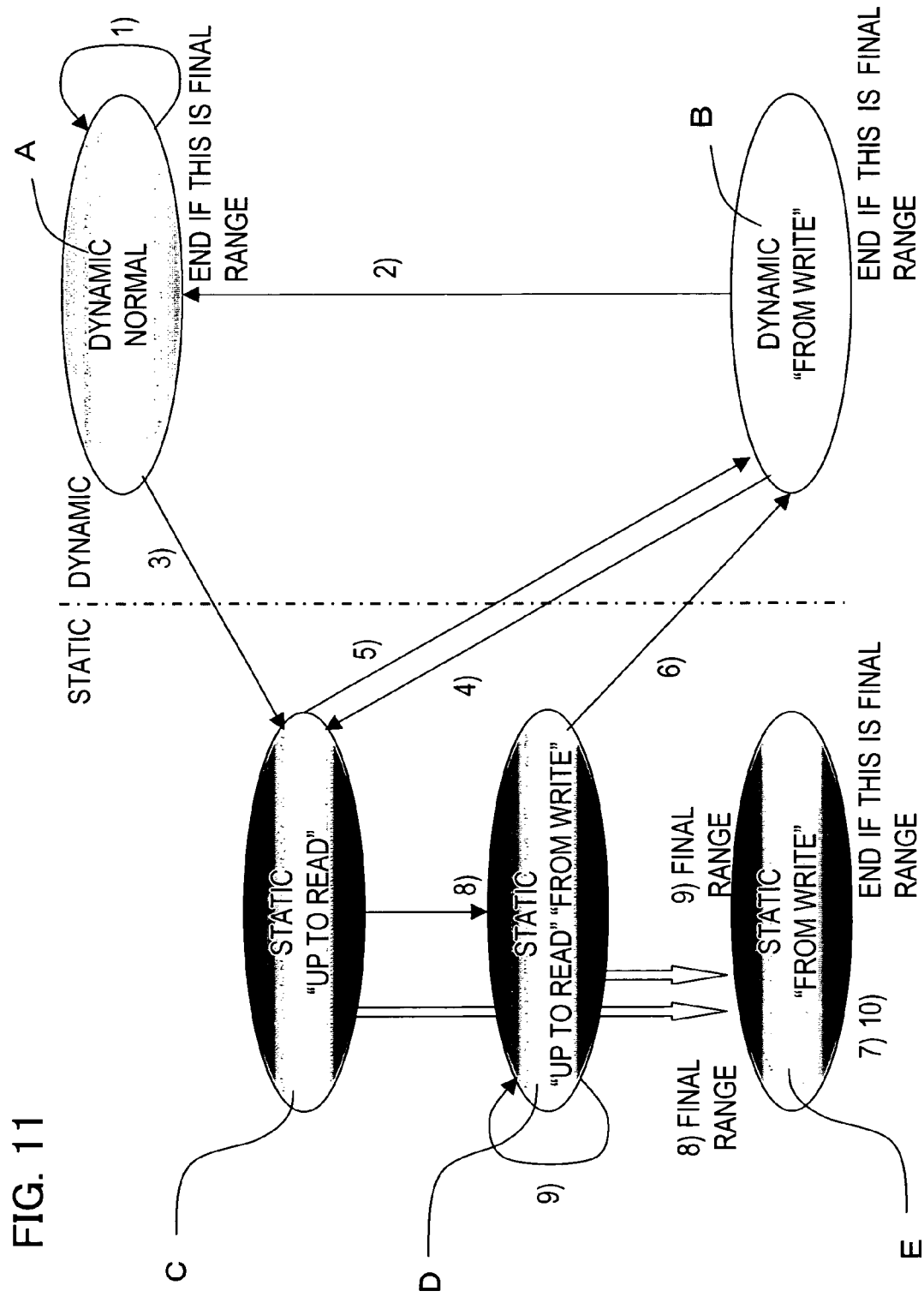
FIG. 11 is a dynamic and static status transition diagram according to an embodiment of the present invention.
Figure 12:
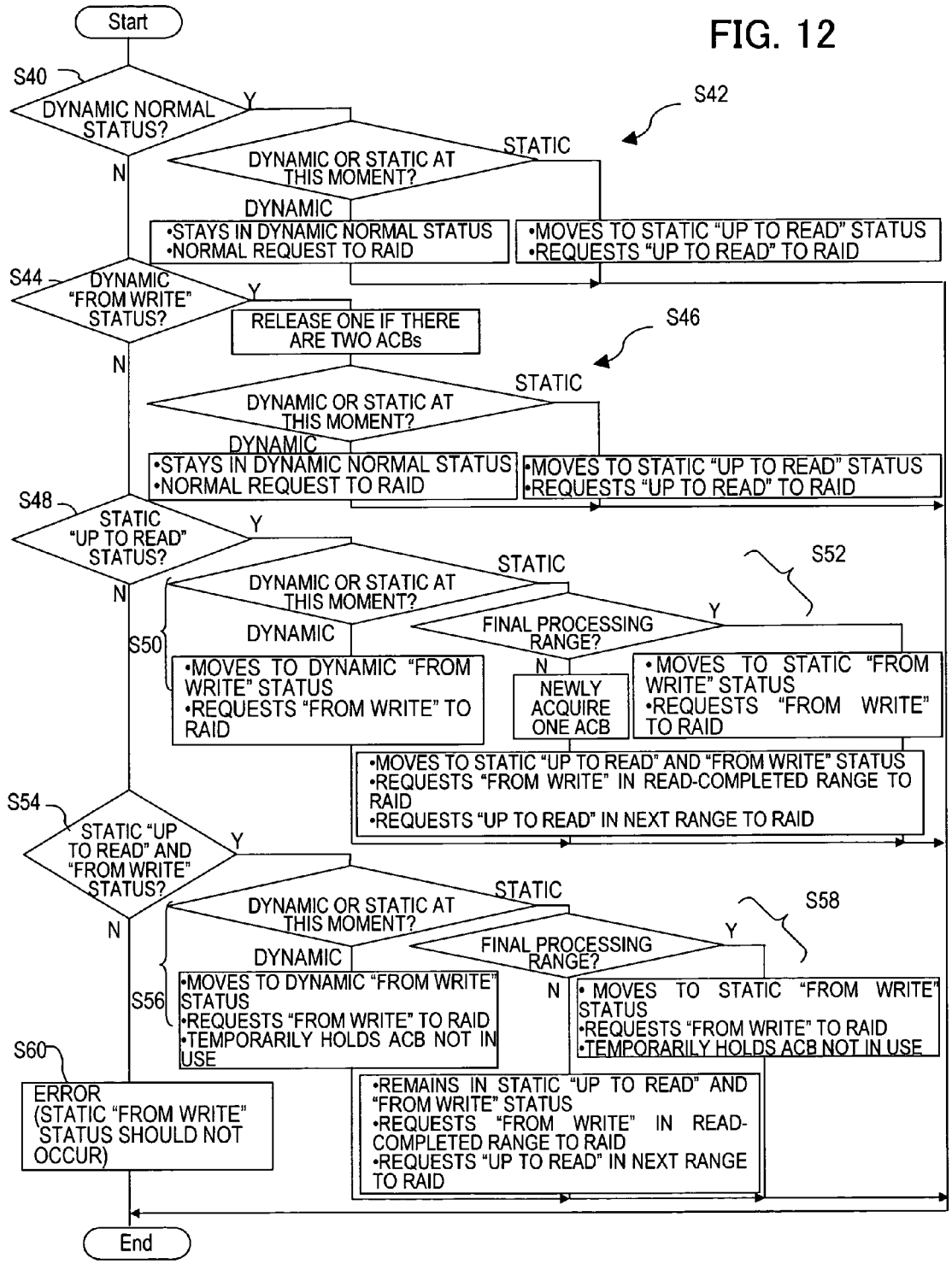
FIG. 12 is a flow chart depicting the request processing of the Rebuild/Copy back module according to an embodiment of the present invention.
Figure 13:
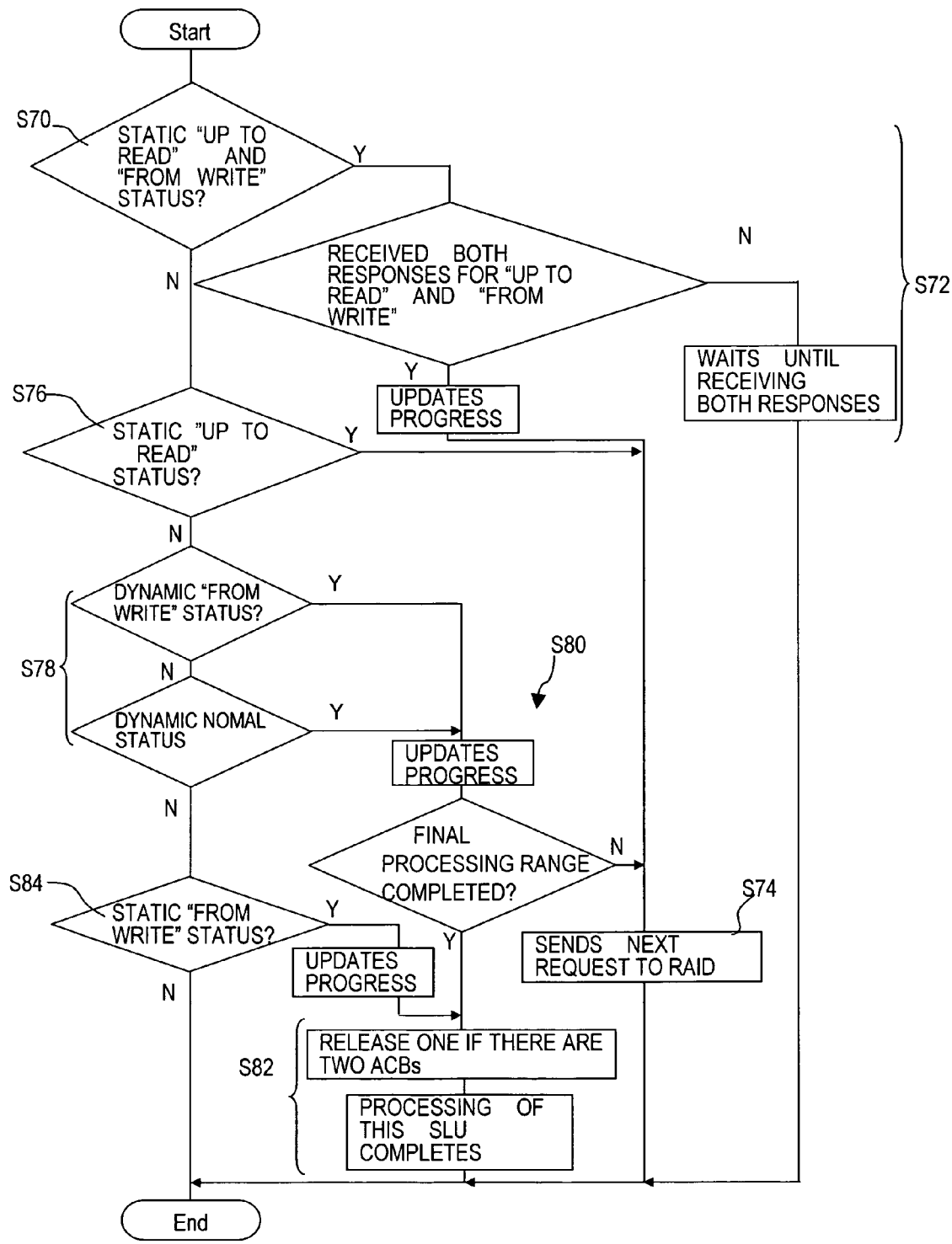
FIG. 13 is a flow chart depicting a response processing of the Rebuild/Copy back module according to an embodiment of the present invention.

FIG. 11 is a status transition diagram of the static status and dynamic status when read and write are separated, FIG. 12 is a flow chart depicting the request processing of the OVSM module to the RAID control module, and FIG. 13 is a flow chart depicting the processing of the OVSM module when a response from the RAID control module is received.

When the Rebuild/Copy back processing is divided into the processing "up to read" and the processing "after write", the dynamic status and the static status, which the OVSM module 634 must decide, have five possible statuses in terms of the status transition, as shown in FIG. 11.

There is the dynamic normal status A where both "from read" and "up to write" were processed in the dynamic status the last time, the dynamic "from write" status B where "from write" was processed in the dynamic status the last time, the static "up to read" status C where "up to read" was processed in the static status the last time, and the static "up to read" and "from write" status D where both read and write were performed in the static status the last time, and the static "from write" status E where "up to write" was processed in the static status the last time.

The default status (status where the OVSM module is started up from the RAID recovery module (not illustrated) of the system control module 608 in FIG. 3) is the dynamic status A. Hereafter it is assumed that ACB is for controlling the processing and ACBs are provided for the number of parallels when parallel processing is performed. Also at the point when the OVSM module is about to perform Rebuild/Copy back, one ACB has already been acquired for operation.

(1) In the case of transition from the previous dynamic status (Rebuild/Copy back is normal) A to the current dynamic status A, the next processing range (size for dynamic processing) is set, and a normal request (write is requested after read) is sent to the RAID control module 632, just like the last time. If there is no next processing range of the Rebuild/Copy back, the Rebuild/Copy back of this LU (Logical Unit) completes.

(2) In the case of transition from the previous dynamic status (Rebuild/Copy back is only for "from write") B to the current dynamic status A, ACB is released if ACB has been acquired. And just like (1), the next processing range (size for dynamic processing) is set, and a normal request is sent to the RAID control module 632. If there is no next processing range, the Rebuild/Copy back of this LU completes after the above ACB is released.

(3) In the case of transition from the previous dynamic status (Rebuild/Copy back is normal) A to the current static status C, the next processing range (size for static processing) is set, and a request for "up to read" is sent to the RAID control module 632. This corresponds to the processing for the first time in FIG. 8. If there is no next processing range, the Rebuild/Copy back of this LU completes.

(4) In the case of transition from the previous dynamic status (Rebuild/Copy back is only for "from write") B to the current static status C, ACB is released if ACB has been acquired. And the next processing range (size for static processing) is set, and a request for "up to read" is sent to the RAID control module 632. This corresponds to the processing for the first time in FIG. 8. If there is no next processing range, the Rebuild/Copy back of this LU completes.

(5) In the case of transition from the previous static status (Rebuild/Copy back is only for "up to read") C to the current dynamic status B, a request for "from write" is sent to the RAID control module 632 for the same processing range.

(6) In the case of transition from the static status (Rebuild/Copy back is for both "from write" and "up to read") D to the current dynamic status B, the processing waits until ACB returns for both read and write, and a request for "from write" is sent to the RAID control module 632 for the same processing range for the ACB of "up to read". The ACB of "from write" is temporarily held.

(7) In the case of transition from the previous static status (Rebuild/Copy back is only for "from write") E to the current dynamic status B, which is only when there is no next processing of Rebuild/Copy back, the Rebuild/Copy back of this LU completes after ACB is released. This corresponds to the final processing in FIG. 8.

(8) In the case of transition from the previous static status (Rebuild/Copy back is only for "up to read") C to the current static status D, one internal ACB is acquired, and the acquired ACB and the originally existent ACB are linked. If the acquisition of the internal ACB fails, an operation the same as the case of dynamic statuses A and B is performed. And for the ACB of "up to read" (originally existent ACB), a request for "from write" is sent to the RAID control module 632 for the same processing range. And for the acquired ACB, the next processing range (size for static processing) is set, and a request for "up to read" is sent to the RAID control module 632. If there is no next processing range, an ACB is not acquired, and only a request for "from write" is sent to the RAID control module 632. This corresponds to the parallel processing for the second and later time in FIG. 8.

(9) In the case of transition from the previous static status (Rebuild/Copy back is for both "from write" and "up to read") D to the current static status D, the processing waits until the ACB returns for both read and write, and a request for "from write" is sent to the RAID control module 632 for the same processing range for the ACB of "up to read", just like the previous time. For the ACB of "from write", the next processing range (size for static processing) is set, and a request for "up to read" is sent to the RAID control module 632. If there is no next processing range, only a request for "from write" is sent to RAID control.

(10) The case of transition from the previous static status (Rebuild/Copy back is only for "from write") E to the current static status D is only when there is no next processing. If there is no next processing range, Rebuild/Copy back of this LU completes after the ACB is released.

For various error recoveries, the RAID control module 632 provides "resource release only", as shown in FIG. 9 and FIG. 10, as a processing only for releasing resources (exclusive control/data buffer) acquired in "up to read", separately from "up to read" and "from write".

In this way, even if the Rebuild/Copy back processing is divided into process for "up to read" and processing for "after write", the parallel processing of write and read can be continued whether the transition of dynamic status and static status occurs or not.

Now the processing of the OVSM module, when a request is sent to the RAID control module to implement the above, will be described with reference to FIG. 12.

(S40) The OVSM module 634 confirms the dynamic status or the static status from the I/O presence confirmation response from the RAID control module 632. First it is judged whether the status was the dynamic normal status the last time.

(S42) If it was the dynamic normal status the last time, the OVSM module 634 judges whether it is the dynamic status or the static status this time (current time). If it is the dynamic status this time, the next processing range (size for dynamic processing) is set, just like the case of (1), and a normal request (write is requested after read) is sent to the RAID control module 632. If there is no next processing range of Rebuild/Copy back, the Rebuild/Copy back of this LU (Logical Unit) completes. If the status moved to the static status this time, the next processing range (size for static processing) is set, just like the case of (3), and a request for "up to read" is set to the RAID control module 632. This corresponds to the processing for the first time in FIG. 8. If there is no next processing range, the Rebuild/Copy back of this LU completes. And request processing ends.

(S44) If it is not dynamic normal status, the OVSM module 634 judges whether it is dynamic "from write" status.

(S46) If it was the dynamic "from write" status the last time, the OVSM module 634 judges if there are two ACBs, and release one if there are two, then the OVSM module 634 judges whether it is dynamic status or static status this time (current time). If it is the dynamic status this time, the status moves to the dynamic normal status, and the next processing range (size for dynamic processing) is set just like the case of (2), and a normal request (write is requested after read) is sent to the RAID control module 632. If it is judged as the static status this time, then the next processing range (size for static processing) is set, just like the case of (4), and a request for "up to read" is sent to the RAID control module 632. And request processing ends.

(S48) If it is not the dynamic "from write" status, the OVSM module 634 judges whether it is static "up to read" status C.

(S50) If it was the static "up to read" status the last time, the OVSM module 634 judges whether it is dynamic status or static status this time (current time). If it is the dynamic status this time, the status moves to the dynamic "from write" status, just like the case of (5), and a request for "from write" is sent to the RAID control module 632. And request processing ends.

(S52) If it is judged as the static status this time, then it is judged whether this is the final processing range. If it is the final processing range, the static "up to read" status moves to the static status D, and a request for "from write" is sent to the RAID control module 632. If not the final processing range, then the OVSM module 634 acquires one ACB, and changes the static "up to read" status to the static status D, sends a request for "from write" in the range of which reading completed to the RAID control module 632, sets the next processing range (size for dynamic processing), and sends a request for "up to read" to the RAID control module 632. And request processing ends.

(S54) If it is not the static "up to read" status, the OVSM module 634 judges whether it is the static "up to read" and "from write" status D.

(S56) If it was the "up to read" and "from write" status D the last time, the OVSM module 634 judges whether it is dynamic status or static status this time (current time). If it is the dynamic status this time, the status moves to the dynamic "from write" status, just like (6), and sends a request for "from write" to the RAID control module 632. The ACB not in use is temporarily held. And request processing ends.

(S58) If it is the static status this time, the OVSM module 634 judges whether this is the final processing range. If it is the final processing range, the status moves to the static "from write" status, and a request for "from write" is sent to the RAID control module 632. The ACB not in use is temporarily held. If not the final processing range, the OVSM module 634 maintains the status as static status D, sends a request for "from write" in the range of which reading completed to the RAID control module 632, sets the next processing range (size for dynamic processing), and sends a request for "up to read" to the RAID control module 632. And request processing ends.

(S60) If it is not the static "up to read" and "from write" status D, the OVSM module 634 performs error processing. In other words, transition from the static "from write" status D should not occur. And the request processing ends.

Now the processing of the OVSM module when a response is received from the RAID control module will be described with reference to FIG. 13.

(S70) When a response is received from the RAID control module 632, the OVSM module 634 judges whether it is the static "up to read" and "from write" status D.

(S72) If it is the static "up to read" and "from write" status D, the CVSM module 634 judges whether a completion response was received from the RAID control module 632 for both "up to read" and "from write". If both responses were not received, the processing waits until both responses are received. If it is judged that both responses were received, the progress information 416 is updated.

(S74) And the next request is sent to the RAID control module 634 (see FIG. 12).

(S76) If the OVSM module 634 judges that it is not the static "up to read" and "from write" status D, on the other hand, the OVSM module 634 judges whether it is the static "up to read" status C. If the OVSM module 634 judges that it is the static "up to read" status C, the processing moves to step S74.

(S78) If the OVSM module 634 judges that it is not the static "up to read" status C, the OVSM module 634 judges whether it is the dynamic "from write" status B. If the OVSM module 634 judges that it is not the dynamic "from write" status B, then the OVSM module 634 judges whether it is the dynamic normal status A.

(S80) If the OVSM module 634 judges that the status is neither the dynamic "from write" status B nor the dynamic normal status A, the OVSM module 634 updates the progress information 416, and judges whether it is the final processing range. If it is not the final processing range, the processing moves to step S74.

(S82) If it is the final processing range, one ACB is released if there are two, and the processing of this RLU completes.

(S84) If the OVSM module 634 judges that it is not dynamic normal status A, the OVSM module 634 judges whether it is the static "from write" status E. If the OVSM module 634 judges that it is the static "from write" status E, the progress information 416 is updated, and the processing moves to step S82. If the OVSM module 634 judges that it is not the static "from write" status, the processing ends.

In this way, by installing the status transition judgment module 634-5 for performing the above processing in the OVSM module 634, the changes of the RAID control module 632 can be minimized. In other words, as described in FIG. 9 and FIG. 10, it is sufficient merely to divided Rebuild/Copy back processing into processing "up to read" and processing "after write".

When the Rebuild/Copy back processing is divided into processing "up to read" and processing "after write", the parallel processing of write and read can be continued even if transition occurs between dynamic status and static status.

Other Embodiments

In the above embodiments, a disk array device having the configuration in FIG. 1 was used for description, but the present invention can be applied to disk array devices with other configurations. For the physical disk, a magnetic disk, optical disk, magneto-optical disk and various types of storage devices can be used.

The time for monitoring the presence of a normal I/O is 5 seconds, but a different monitoring time can be used, and the judgment of the presence of an I/O may be executed by the OVSM module. The change of the processing size is double the default value, but other multiples, such as 1.5 times, may be used, or a different processing size may be set depending on the presence of a normal I/O.

The status was divided into five to describe transition, but statuses may be simplified by omitting the dynamic "from write" status, for example.

The present invention was described by the embodiments, but the present invention can be modified in various ways within the scope of the essential character of the present invention, and these variant forms shall not be excluded from the scope of the present invention.

As described above, in Rebuild/Copy back, the data is read from one disk and written to another disk, so the presence of a normal I/O is judged, and when a normal I/O is absent, the read and write of these different disk drives are executed simultaneously. By this, the Rebuild/Copy back time can be decreased.

What is claimed is:

1. A RAID system for accessing a connected disk device and executing an I/O request according to the I/O request requested by a host, comprising:

a plurality of said disk devices constituting a RAID; and a controller for executing an operation of reading data of a disk device, other than a failed disk device, when one of said plurality of disk devices failed, and writing the data to a spare disk device or a new disk device in parts for a plurality of times to execute Rebuild, or Copy back processing for reconstructing the RAID configuration, wherein said controller judges whether a normal I/O request, including an I/O request from said host, does not arrive for a predetermined time, concurrently executes read processing of one disk device and write processing of another disk device in said Rebuild or Copy back if said normal I/O request does not arrive for a predetermined time, and executes alternately said normal I/O request and a request of one of read and write of said disk device for one time of said Rebuild or Copy back if said normal I/O request arrives in a predetermined time.

2. The RAID system according to claim 1, wherein said controller records the processing completion time of a normal I/O request each time the processing of said normal I/O request completes, and compares said processing completion time and current time to judge whether a normal I/O request does not arrive for a predetermined time.

3. The RAID system according to claim 1, wherein said controller further comprises a progress table for managing the progress status of said Rebuild or Copy back processing, and said controller creates a read request for one time for Rebuild or Copy back processing according to said progress table, and updates said progress table according to the completion of the parallel write and read of said Rebuild or Copy back.

4. The RAID system according to claim 1, wherein said controller further comprises:

a RAID control module for executing a request for said Rebuild or Copy back by dividing the request into processing up to read and processing from write; and a Rebuild/Copy back module for issuing the read request and write request of said Rebuild or Copy back processing independently to said RAID control module.

5. The RAID system according to claim 4, wherein said Rebuild/Copy back module judges the transition between the case when a normal I/O request does not arrive for a predetermined time and the case when said normal I/O request arrives within a predetermined time, and issues the read and write requests of said Rebuild or Copy back in parallel according to said judgment result.

6. The RAID system according to claim 1, wherein said controller issues a read request for one time of said Rebuild or Copy back processing when the case when said normal I/O request arrives within a predetermined time transits to the case when said normal I/O request does not arrive for a predetermined time, and issues read and write requests for said Rebuild or Copy back in parallel when the processing of said read request completes.

7. The RAID system according to claim 1, wherein when one of said plurality of disk devices constituting said RAID fails, said controller executes an operation of reading data of a disk device, other than the failed disk device, and writing the data to a spare disk device in parts for a plurality of times, and after executing the Rebuild processing for reconstructing the RAID configuration, said controller executes an operation of reading the data in said spare disk device and writing the data to a new disk device provided in place of said failed disk device, in parts for a plurality of times, so as to execute Copy back processing.

8. A RAID controller for accessing a connected disk device and executing an I/O request according to the I/O request requested by a host, comprising:

a first interface circuit for controlling interface with said host;

a second interface circuit for controlling interface with said plurality of disk devices constituting the RAID; and a controller for executing an operation of reading data of a disk device, other than a failed disk device, when one of said plurality of disk devices fails, and writing the data to a spare disk device or a new disk device in parts for a plurality of times, and executing Rebuild or Copy back processing for reconstructing the RAID configuration, wherein said controller judges whether a normal I/O request, including an I/O request from said host, does not arrive for a predetermined time, concurrently executes read processing of one disk device and write processing of another disk device in said Rebuild or Copy back if said normal I/O request does not arrive for a predetermined time, and executes alternately said normal I/O request and a request of one of read and write of said disk device for one time of said Rebuild or Copy back if said normal I/O request arrives in a predetermined time.

9. The RAID controller according to claim 8, wherein said controller records the processing completion time of a normal I/O request each time the processing of said normal I/O request completes, and compares said processing completion time and current time to judge whether a normal I/O request does not arrive for a predetermined time.

10. The RAID controller according to claim 8, wherein said controller further comprises a progress table for managing the progress status of said Rebuild or Copy back processing, and said controller creates a read request for one time for Rebuild or Copy back processing according to said progress table, and updates said progress table according to the completion of the parallel write and read of said Rebuild or Copy back.

11. The RAID controller according to claim 8, wherein said controller further comprises:

a RAID control module for executing a request for said Rebuild or Copy back by dividing the request into processing up to read and processing from write; and a Rebuild/Copy back module for issuing the read request and write request of said Rebuild or Copy back processing independently to said RAID control module.

12. The RAID controller according to claim 11, wherein said Rebuild/Copy back module judges the transition between the case when a normal I/O request does not arrive for a predetermined time and the case when said normal I/O request arrives within a predetermined time, and issues the read and write requests of said Rebuild or Copy back in parallel according to said judgment result.

13. The RAID controller according to claim 8, wherein said controller issues a read request for one time of said Rebuild or Copy back processing when the case when said normal I/O request arrives within a predetermined time transits to the case when said normal I/O request does not arrive for a predetermined time, and issues read and write requests for said Rebuild or Copy back in parallel when the processing of said read request completes.

14. The RAID controller according to claim 8, wherein when one of said plurality of disk devices constituting said RAID fails, said controller executes an operation of reading data of a disk device, other than the failed disk device, and writing the data to a spare disk device in parts for a plurality of times, and after executing the Rebuild processing for reconstructing the RAID configuration, said controller executes an operation of reading the data in said spare disk device and writing the data to a new disk device provided in place of said failed disk device, in parts for a plurality of times, so as to execute Copy back processing.

15. A Rebuild/Copy back processing method for a RAID system which accesses a connected disk device and executes an I/O request according to the I/O request requested by a host, comprising the steps of:
   processing Rebuild/Copy back for executing an operation of reading data of a disk device, other than a failed disk device, when one of said plurality of disk devices constituting said RAID fails, and writing the data to a spare disk device or a new disk device in part for a plurality of times to execute Rebuild or Copy back processing for reconstructing the RAID configuration;
   judging whether a normal I/O request, including an I/O request from said host, does not arrive for a predetermined time; and
   concurrently executing read processing of one disk device and write processing of another disk device in said Rebuild or Copy back if said normal I/O request does not arrive for a predetermined time; and
   executing alternately said normal I/O request and a request of one of read and write of said disk device for one time of said Rebuild or Copy back if said normal I/O request arrives in a predetermined time.

16. The Rebuild/Copy back processing method for a RAID system according to claim 15, wherein said judgment step further comprises:
   a step of recording the processing completion time of a normal I/O request each time the processing of said normal I/O request completes; and
   a step of comparing said processing completion time and current time to judge whether a normal I/O request does not arrive for a predetermined time.

17. The Rebuild/Copy back processing method for a RAID system according to claim 16, further comprising:
   a step of creating a read request for one time for Rebuild or Copy back processing according to a progress table for managing the progress status of said Rebuild or Copy back processing; and
   a step of updating said progress table according to completion of the parallel write and read of said Rebuild or Copy back.

* * * * *